US009141768B2

(12) United States Patent
Seong et al.

(10) Patent No.: US 9,141,768 B2
(45) Date of Patent: Sep. 22, 2015

(54) TERMINAL AND CONTROL METHOD THEREOF

(75) Inventors: Hyun-Kyung Seong, Seoul (KR);
Moon-Hee Park, Seoul (KR);
Myung-Hee Hwang, Seoul (KR);
Eui-Hwan Bae, Gyeonggi-Do (KR);
Hong-Il Kwon, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 808 days.

(21) Appl. No.: 12/751,935

(22) Filed: Mar. 31, 2010

(65) Prior Publication Data

US 2010/0315359 A1 Dec. 16, 2010

(30) Foreign Application Priority Data

Jun. 10, 2009 (KR) .................. 10-2009-0051672
Jun. 22, 2009 (KR) .................. 10-2009-0055663
Jun. 29, 2009 (KR) .................. 10-2009-0058501

(51) Int. Cl.
*G09G 3/36* (2006.01)
*G06F 21/10* (2013.01)
(Continued)

(52) U.S. Cl.
CPC .............. *G06F 21/10* (2013.01); *G06F 3/0481* (2013.01); *G06F 3/0483* (2013.01); *G06F 15/025* (2013.01); *G09G 3/36* (2013.01); *G09G 2300/023* (2013.01); *G09G 2380/14* (2013.01)

(58) Field of Classification Search
USPC ........... 345/156–184, 87–104, 107, 204–215, 345/690–699; 178/18.01–20.04
See application file for complete search history.

(56) References Cited

U.S. PATENT DOCUMENTS 4,783,760 A * 11/1988 Carosso .................. 715/210
5,761,682 A * 6/1998 Huffman et al. ......... 715/201
(Continued)

FOREIGN PATENT DOCUMENTS

JP 2004-164097 6/2004
JP 2004-320754 11/2004
(Continued)

OTHER PUBLICATIONS

Microsoft Launches Windows Vista and Microsoft Office 2007 to Consumers Worldwide, Jan. 29, 2007, www.microsoft.com/en-us/news/press/2007/jan07/01-29vistalaunchpr.aspx.*
(Continued)

*Primary Examiner* — Patrick F Marinelli
(74) *Attorney, Agent, or Firm* — Lee, Hong, Degerman, Kang & Waimey

(57) ABSTRACT

A mobile terminal includes a display unit for displaying an electronic book, a user interface for selecting a specific portion to be extracted from the electronic book, a controller for extracting the selected specific portion and copyright information related to the extracted specific portion, and a memory for storing the extracted specific portion and the copyright information. The controller applies the extracted specific portion to an application such that the specific portion is displayed within the application and the copyright information is displayed on the display unit when the specific portion is applied to the application. When the extracted specific portion is applied to the application, the copyright information is automatically included in the applied specific portion. The display unit of the mobile terminal includes an electronic paper display and a liquid crystal display (LCD) and the electronic book is displayed on the electronic paper display.

19 Claims, 29 Drawing Sheets

(51) Int. Cl.
  *G06F 3/0481* (2013.01)
  *G06F 15/02* (2006.01)
  *G06F 3/0483* (2013.01)

(56) References Cited

U.S. PATENT DOCUMENTS

| | | |
|---|---|---|
| 6,252,588 B1 * | 6/2001 | Dawson .................... 715/752 |
| 6,512,497 B1 * | 1/2003 | Kondo et al. .................. 345/1.1 |
| 6,915,103 B2 * | 7/2005 | Blume ........................ 434/317 |
| 6,975,988 B1 * | 12/2005 | Roth et al. .................... 704/260 |
| 7,149,981 B1 * | 12/2006 | Lundy et al. ................. 715/767 |
| 7,545,557 B2 * | 6/2009 | Iftime et al. ................. 359/296 |
| 7,877,460 B1 * | 1/2011 | Brouwer et al. .............. 709/217 |
| 8,074,172 B2 * | 12/2011 | Kocienda et al. .............. 715/263 |
| 2003/0229858 A1 * | 12/2003 | Keohane et al. ............. 715/526 |
| 2004/0252076 A1 | 12/2004 | Kodama |
| 2006/0218492 A1 * | 9/2006 | Andrade ..................... 715/523 |
| 2006/0271494 A1 | 11/2006 | Ito |
| 2007/0157085 A1 * | 7/2007 | Peters ........................ 715/531 |
| 2007/0290986 A1 * | 12/2007 | Kurkinen .................... 345/156 |
| 2008/0059426 A1 | 3/2008 | Brock et al. |
| 2008/0074400 A1 * | 3/2008 | Gettemy et al. ............. 345/173 |
| 2008/0108393 A1 * | 5/2008 | Kim ............................ 455/566 |
| 2008/0256470 A1 * | 10/2008 | Bhogal et al. ............... 715/764 |
| 2009/0042619 A1 * | 2/2009 | Pierce et al. ................. 455/566 |
| 2009/0228842 A1 * | 9/2009 | Westerman et al. ......... 715/863 |
| 2010/0235726 A1 * | 9/2010 | Ording et al. ............... 715/234 |
| 2010/0235729 A1 * | 9/2010 | Kocienda et al. ............ 715/255 |
| 2010/0235734 A1 * | 9/2010 | Ording et al. ............... 715/702 |
| 2011/0050545 A1 * | 3/2011 | Namm et al. ................... 345/5 |

FOREIGN PATENT DOCUMENTS

| | | |
|---|---|---|
| KR | 10-2004-0106458 | 12/2004 |
| WO | 9722063 | 6/1997 |
| WO | 01/90928 | 11/2001 |
| WO | 2006/057639 | 6/2006 |
| WO | 2008/027609 | 3/2008 |

OTHER PUBLICATIONS

Copy and paste mutliple itmes by using the Office Clipboard, Apr. 24, 2012, http://office.microsoft.com/en-us/sharepoint-designer-help/copy-and-paste-multiple-items-by-using-the-office-clipboard-HA010163602.aspx?CTT=1.*
Korean Intellectual Property Office Application Serial No. 10-2009-0055663, Office Action dated Apr. 21, 2015, 6 pages.
European Patent Office Application Serial No. 10003738.1, Search Report dated Jul. 14, 2015, 8 pages.

* cited by examiner

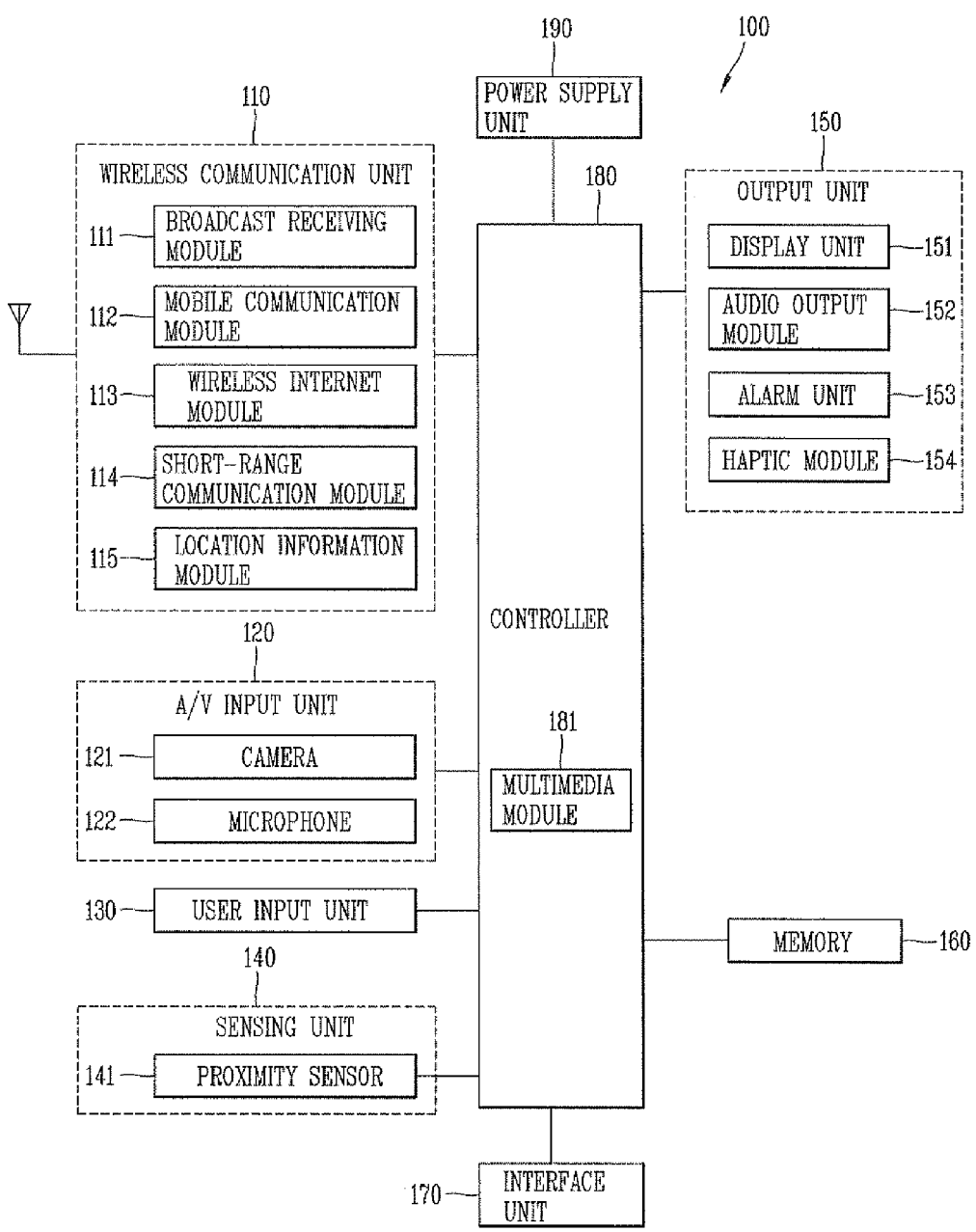

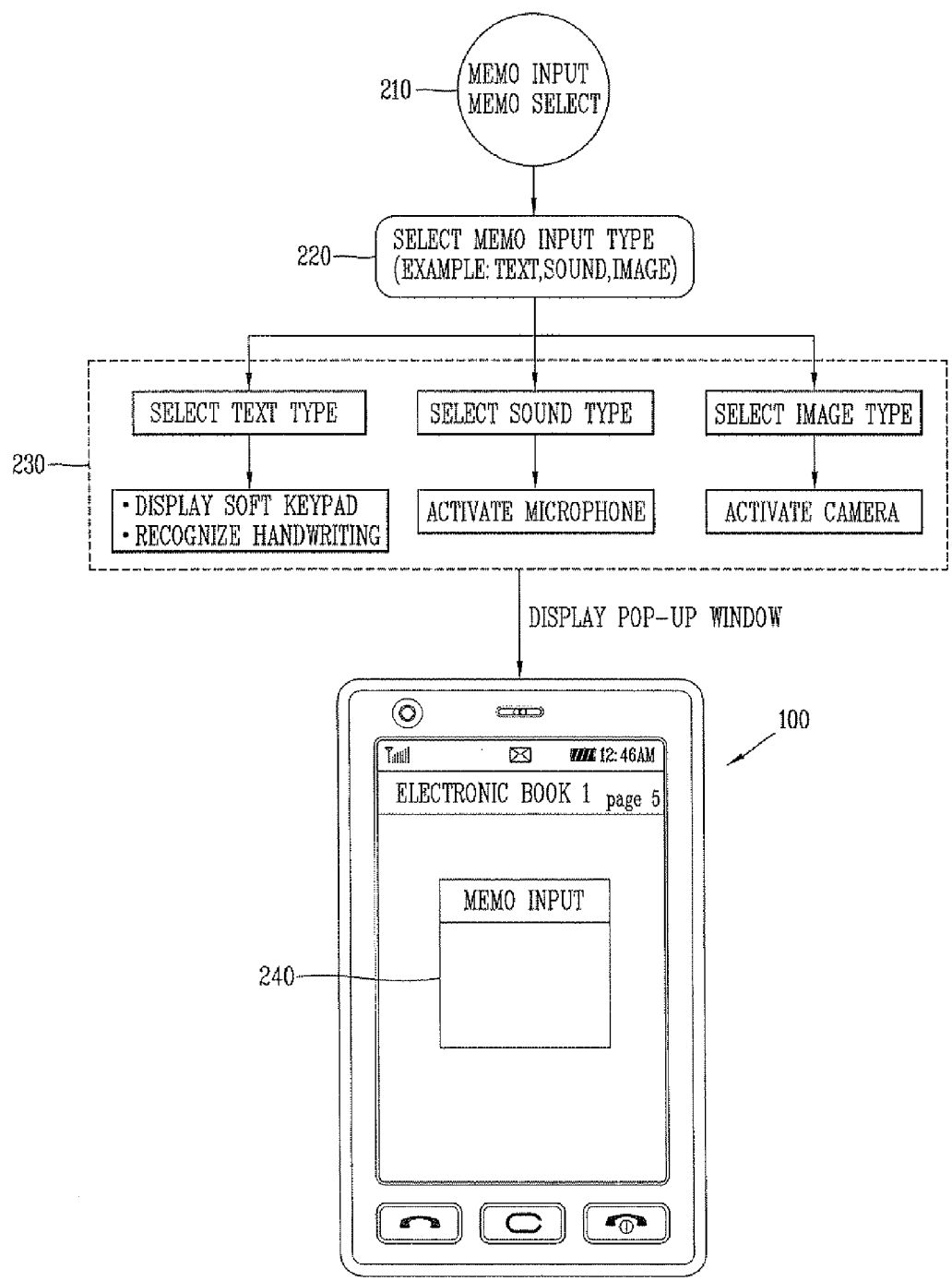

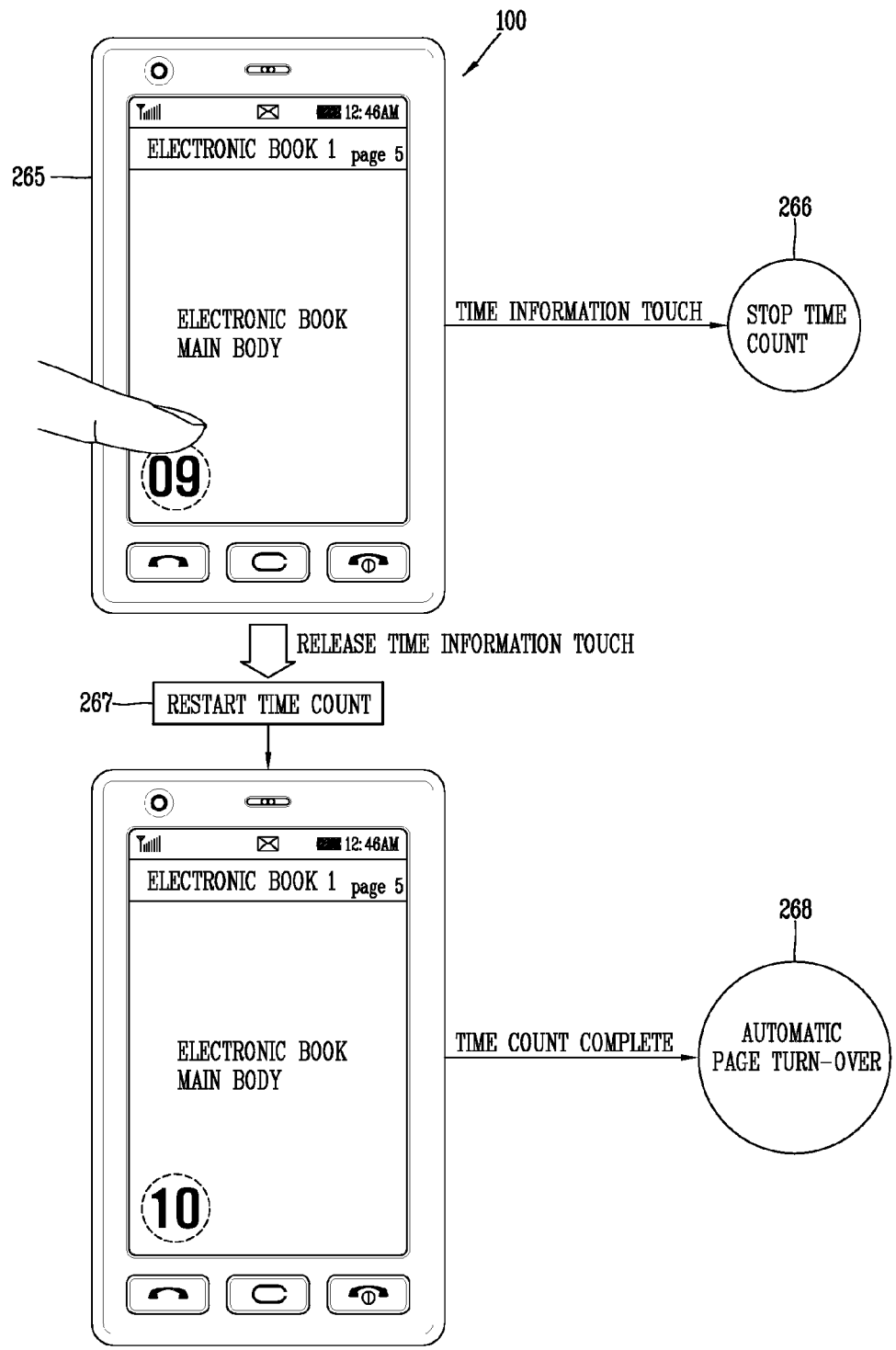

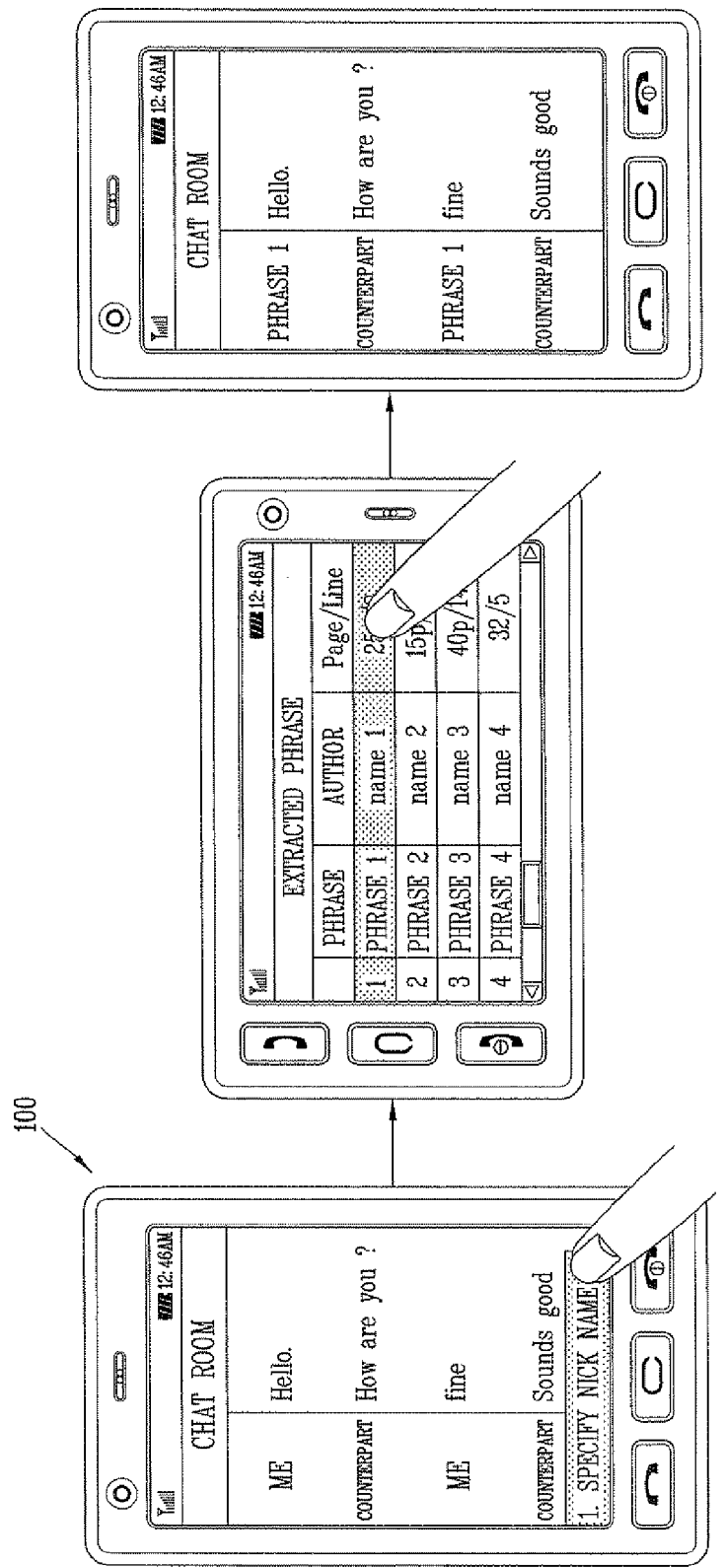

FIG. 17C
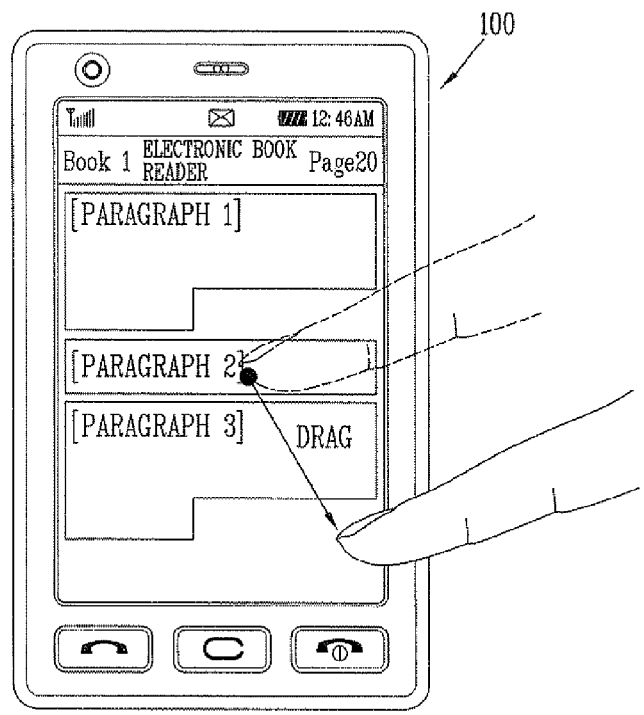
SET AS A BOOKMARK INFORMATION MANUALLY
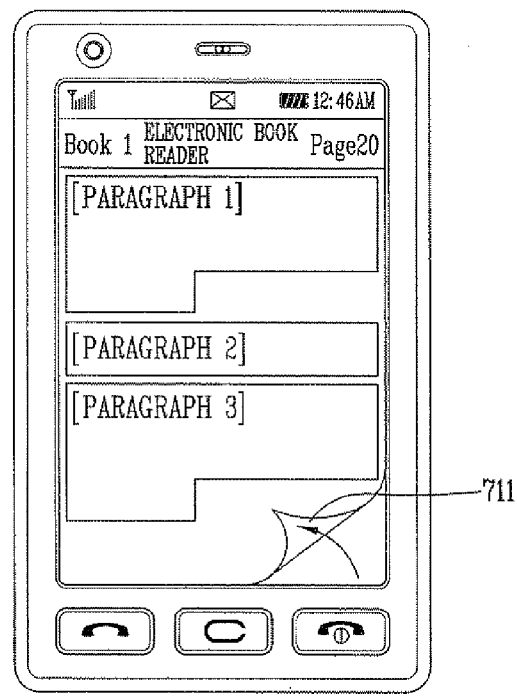

TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application Nos.10-2009-0051672, filed on Jun. 10, 2009, 10-2009-0055663, filed on Jun. 22, 2009, and 10-2009-0058501, filed on Jun. 29, 2009, the contents of which are all hereby incorporated by reference herein in their entireties.

FIELD OF THE INVENTION

The present disclosure relates to a mobile terminal and a control method thereof for extracting a specific portion displayed on an electronic book and applying the extracted specific portion to other applications.

DESCRIPTION OF THE RELATED ART

Terminals can be classified into two types, a mobile terminal and a stationary terminal, based on their mobility. The mobile terminal can be further classified into two types, a handheld terminal and a vehicle mountable terminal, based on their portability by a user.

As terminals become multifunctional, they can be used to capture still images or moving images, play music or video files, play games, and receive broadcast signals, and are therefore implemented as integrated multimedia players. To functionally support and enhance a terminal, a structural and/or software aspect of the terminal needs to be improved. Previously, viewing an electronic book (E-book) or digital book provided in a conventional mobile terminal does not provide the same experience as reading from a paper book. Furthermore, convenient functions are not provided by the E-book or digital book in the conventional mobile terminal. For example, in the conventional mobile terminal, a specific phrase cannot be extracted from the E-book. Also, the specific phrase of the E-book cannot be used in other terminal applications or functions other than the E-book itself. Moreover, even if a user wishes to share the specific phrase of the E-book with others, the specific phrase cannot be extracted, edited, or transmitted to others.

A convenient function for allowing the user to more easily select an E-book is also not available in the conventional mobile terminal. For example, the conventional mobile terminal is merely configured to view and select a title of an E-book stored in a folder classified by the user, but is not configured to select an E-book according to a type or characteristic information related to the E-book.

SUMMARY OF THE INVENTION

According to an embodiment of the present invention, a method of controlling a mobile terminal includes displaying an electronic book on a display of the mobile terminal, extracting a specific portion from the electronic book, storing the extracted specific portion and copyright information related to the specific portion, applying the extracted specific portion to an application such that the specific information is displayed within the application, and displaying the copyright information when the specific portion is applied to the application.

According to another embodiment of the present invention, a mobile terminal includes a display unit displaying an electronic book, the display unit including an electronic paper display and a liquid crystal display (LCD) and the electronic book displayed on the electronic paper display, a user interface selecting a specific portion to be extracted from the electronic book, a controller extracting the selected specific portion and copyright information related to the extracted specific portion, and a memory storing the extracted specific portion and the copyright information. The controller applies the extracted specific portion to an application such that the specific portion is displayed within the application and displays the copyright information on the display unit when the specific portion is applied to the application, wherein the copyright information is automatically included in the applied specific portion.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIG. 1 is a block diagram illustrating a mobile terminal according to an embodiment of the present invention.

FIGS. 3A through 3C illustrate a memo function in an electronic book reader in a mobile terminal according to an embodiment of the present invention.

FIGS. 4A through 4C illustrate a page turn-over function in an electronic book reader in a mobile terminal according to an embodiment of the present invention.

FIGS. 12A through 12F illustrate a method of using specific information extracted from an E-book application in a mobile terminal in various applications according to yet another embodiment of the present invention.

FIGS. 17A through 17F are flowcharts illustrating a method of displaying an E-book in a mobile terminal according to an embodiment of the present invention.

DETAILED DESCRIPTION OF PREFERRED EMBODIMENTS

Figure 2A:
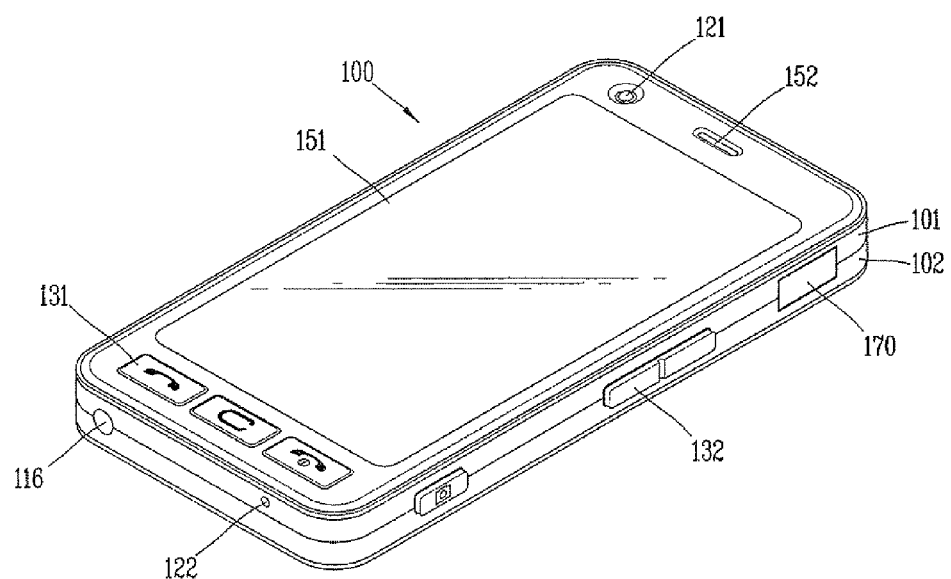
FIG. 2A is a front perspective view of a mobile terminal according to an embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the following description, a mobile terminal will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigation system and the like. However, it is easily understood by those skilled in the art that a configuration according to the embodiments disclosed herein may be applicable to stationary terminals such as a digital TV, desktop computer, and the like, as well as mobile terminals.

Referring to FIG. 1, the mobile terminal 100 includes a wireless communication unit 110, an Audio/Video (A/V) input unit 120, a user input unit 130, a sensing unit 140, an output unit 150, a memory 160, an interface unit 170, a controller 180, and a power supply unit 190. However, the constituent elements as illustrated in FIG. 1 are not necessarily required, and the mobile terminal 100 may be implemented with greater or lesser number of elements than those illustrated elements.

The wireless communication unit 110 typically includes one or more elements allowing radio communication between the mobile terminal 100 and a wireless communication system, or between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in which a data broadcast signal is combined with the TV or radio broadcast signal.

The broadcast associated information may be information regarding a broadcast channel, a broadcast program, a broadcast service provider, and the like. The broadcast associated information may also be provided through a mobile communication network. As such, the broadcast associated information may be received by the mobile communication module 112.

The broadcast associated information may exist in various forms. For example, it may exist in the form of an electronic program guide (EPG) of a digital multimedia broadcast (DMB), an electronic service guide (ESG) of a digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. The wireless Internet module 113 may use a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. The short-range communication module 114 may use a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal. An example of the location information module 115 is a global positioning system (GPS) module.

Referring to FIG. 1, the A/V input unit 120 receives an audio or video signal, and the A/V input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal 100.

The microphone 122 receives an external audio signal in a phone call mode, a recording mode, a voice recognition mode, or the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated while receiving the external audio signal.

The user input unit 130 may generate input data to control an operation of the mobile terminal 100. The user input unit 130 may be configured as a keypad, a dome switch, a pressure/capacitance touch pad, a jog wheel, a jog switch, or the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, and a haptic module 154.

The display unit 151 outputs information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. Those displays may be configured as a transparent or optically transparent type to allow viewing through the display unit 151, and may be called transparent displays. An example of a typical transparent display is a transparent LCD (TOLED). Under this configuration, a user can view an object positioned at a rear side of a terminal body through a region occupied by the display unit 151 of the terminal body.

The display unit 151 may be implemented as two or more displays according to a configured aspect of the mobile terminal 100. For instance, a plurality of the display units 151 may be arranged on one surface to be spaced apart from or integrated with each other, or may be arranged on different surfaces.

If the display unit 151 and a touch sensitive sensor or a touch sensor have a layered structure therebetween, the structure may be referred to as a touch screen. The display unit 151 may be used as an input device as well as an output device. The touch sensor may be implemented as a touch film, a touch sheet, a touch pad, or the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, the proximity sensor 141 may be arranged at an inner region of the mobile terminal 100 covered by the touch screen, or near the touch screen. The proximity sensor 141 senses a presence or absence of an object approaching a surface, or an object disposed near a surface, by using an electromagnetic field or infrared rays without the object physically contacting the surface. The proximity sensor 141 may have a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, or an infrared ray proximity sensor. When the touch screen is implemented as a capacitance type, proximity of a pointer to the touch screen is sensed by changes of an electromagnetic field. In this case, the touch screen or touch sensor may be categorized as a proximity sensor 141.

Hereinafter, for the sake of convenience of brief explanation, the pointer being positioned proximate to the touch screen without actual contact will be referred to as a "proximity touch," whereas the pointer substantially contacting the touch screen will be referred to as a "contact touch." A position of the pointer on the touch screen corresponding to the proximity touch is a position where the pointer faces perpendicular to the touch screen when the proximity touch is performed.

The proximity sensor 141 senses the proximity touch, and proximity touch patterns may include distance, direction, speed, time, position, and moving status. Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, or a broadcast reception mode. The audio output module 152 may output audio signals relating to functions performed in the mobile terminal 100, such as a sound indicating a call received or a message received. The audio output module 152 may include a receiver, a speaker, and a buzzer.

The alarm unit 153 outputs signals notifying the occurrence of events on the mobile terminal 100. The events occurring on the mobile terminal 100 may include a call received, message received, key signal input, and touch input. The alarm unit 153 may output not only video or audio signals, but also other types of signals such as signals notifying the occurrence of events via vibration. Since the video or audio signals can be output through the display unit 151 or the audio output module 152, the display unit 151 and the audio output module 152 may be categorized as part of the alarm unit 153.

The haptic module 154 generates various tactile effects which a user can feel. A representative example of the tactile effects generated by the haptic module 154 includes vibration. Vibration generated by the haptic module 154 may have a controllable intensity and a controllable pattern. For example, a different type of vibration may be output in a synthesized manner or in a sequential manner.

The haptic module 154 may generate other tactile effects, such as an arrangement of pins vertically moving with respect to skin being touched or contacted, an air injection force or air suction force through an injection hole or a suction hole, a touch by a skin surface, a presence or absence of contact with an electrode, a stimulus effect by an electrostatic force, a reproduction of a cold or hot sensation using a heat absorbing device or a heat emitting device, and the like. The haptic module 154 may be configured to transmit tactile effects or signals through a user's direct contact, or a user's muscular sense using a finger or a hand. The haptic module 154 may be implemented as two or more structures/modules according to the configuration of the mobile terminal 100.

The memory 160 may store a program for the processing and control of the controller 180. Alternatively, the memory 160 may temporarily store input/output data such as phonebook data, messages, still images, video and the like. The memory 160 may also store data related to various patterns of vibrations and audio output upon the touch input on the touch screen.

The memory 160 may be implemented using any type of suitable storage medium including a flash memory type, a hard disk type, a multimedia card micro type, a memory card type such as SD or DX memory, Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. The mobile terminal 100 may store data at a web storage which performs the storage function of the memory 160 on the Internet.

The interface unit 170 may generally be implemented to interface the mobile terminal 100 with external devices. The interface unit 170 may allow data reception from an external device, power delivery to each component in the mobile terminal 100, or data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephone calls, data communications, video calls, and the like. The controller 180 may include a multimedia module 181 which provides multimedia playback. The multimedia module 181 may be configured as part of the controller 180 or as a separate component. The controller 180 may also perform pattern recognition processing so as to recognize writing or drawing input on the touch screen as a text or image.

The power supply unit 190 provides power required by various components under the control of the controller 180. The provided power may be internal power, external power, or a combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of a plurality of functions and operations. The software codes can be implemented with a software application written in any suitable programming language. The software codes may be stored in the memory 160 and executed by the controller 180.

Referring to FIG. 2A, the mobile terminal 100 according to an embodiment of the present invention is provided with a bar-type terminal body. However, the present invention is not only limited to this type of terminal, but also applicable to various structures of terminals such as a slide type, folder type, swivel type, swing type, and the like, in which two or more bodies are combined with each other in a relatively movable manner.

The terminal body includes a case, such as a casing, housing, or cover, forming an appearance of the mobile terminal 100. In this embodiment, the case may be divided into a front case 101 and a rear case 102 and various electronic components are built in a space formed between the front case 101 and the rear case 102. At least one middle case may be additionally disposed between the front case 101 and the rear case 102. The cases may be formed by injection-molding a synthetic resin or formed of a metal material such as stainless steel (STS), titanium (Ti), or the like.

A display unit 151, a first audio output module 152, a first camera 121, a user input unit 130, which includes manipulation units 131 and 132, a microphone 122, an interface unit 170, and the like may be arranged on the terminal body, mainly on the front case 101.

The display unit 151 occupies a majority of the front case 101. The first audio output module 152 and the first camera 121 are disposed on a region adjacent to one end of the display unit 151, and the manipulation unit 131 and the microphone 122 are disposed on a region adjacent to another end thereof. The manipulation unit 132 and the interface unit 170, and the like, may be disposed on a lateral surface of the front case 101 and the rear case 102.

The user input unit 130, which includes the manipulation units 131 and 132, is manipulated to receive a command for controlling the operation of the mobile terminal 100. The manipulation units 131, 132 may be commonly designated as a manipulating portion, and any method may be employed to allow the user to perform manipulation with a tactile feeling.

The content inputted by the manipulation units 131, 132 may be set in various ways. For example, the first manipulation unit 131 may be used to receive a command, such as a start command, end command, scroll command, 3D browser execution command, or the like. The second manipulation unit 132 may also be used to receive a command, such as a command for controlling a volume level being outputted from the first audio output unit 152, or switching the terminal into a touch recognition mode of the display unit 151.

Figure 2B:
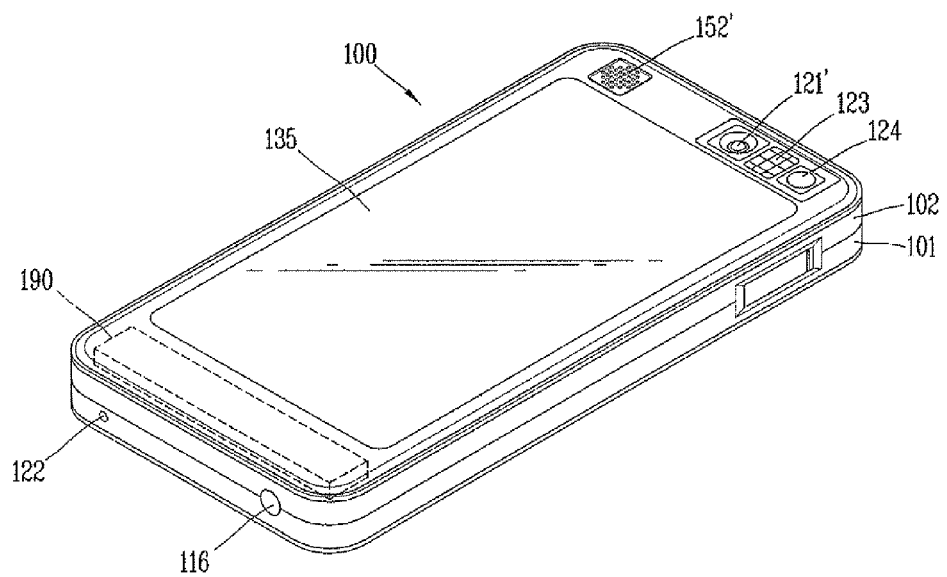
FIG. 2B is a rear perspective view of a mobile terminal according to an embodiment of the present invention.

FIG. 2B is a rear perspective view of the mobile terminal 100 shown in FIG. 2A. Referring to FIG. 2B, a second camera 121' may be additionally mounted on a rear surface of the terminal body, namely, the rear case 102. An image capturing direction of the second camera 121' is substantially opposite to the direction of the first camera 121 shown in FIG. 2A. The second camera 121' may generate images having different pixels compared to images generated by the first camera 121.

For example, the first camera 121 may have has a relatively low resolution so as to not cause difficulty when the user captures his or her own image and sends it to another party during a video call or the like. The second camera 121' may have a relatively higher resolution allowing the user to capture an image of a general object that does not have to be sent immediately. The first and second cameras 121, 121' may be provided in the terminal body in a rotatable manner.

Furthermore, a flash 123 and a mirror 124 may be additionally disposed adjacent to the second camera 121'. The flash 123 illuminates light toward an object when capturing the object with the second camera 121'. The mirror 124 allows the user to look at his or her own image reflection when capturing an image of himself or herself, in a self-portrait mode, for example, by using the second camera 121'.

Furthermore, a second audio output module 152' may be additionally disposed on a rear surface of the terminal body. The second audio output unit 152' together with the first audio output unit 152 shown in FIG. 2A can implement a stereo effect or a speaker phone mode during a phone call.

Furthermore, an antenna 116 for receiving broadcast signals may be additionally disposed on a lateral surface of the terminal body. The antenna 116 constituting a broadcast receiving module 111 shown in FIG. 1 may be provided so as to be pulled out from the terminal body.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured as an optical transmission type similar to the display unit 151. In this case, if the display unit 151 is configured to output visual information from both sides of the display unit 151, then the visual information may be also recognized through the touch pad 135. The information being outputted from both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same size or be smaller than the display unit 151.

Various kinds of visual information may be displayed on the display unit 151. The visual information may be displayed in a form of characters, numerals, symbols, graphics, or icons. For an input of the visual information, at least one of the characters, numerals, symbols, graphics, or icons may be displayed with a predetermined arrangement so as to be implemented in a keypad form. Such a keypad may be referred to as a so-called "soft key."

Hereinafter, preferred embodiments associated with a control method that can be implemented in a terminal having the foregoing configuration will be described with reference to the accompanying drawings. The following embodiments may be used alone or in combination with one another. Furthermore, the following embodiments may be used in combination with the foregoing user interface (UI).

The present disclosure provides various methods associated with a function of viewing an electronic book (E-book) in the mobile terminal 100. The E-book is also called a digital book, which is configured with an electronic file allowing the user to retrieve and read at anytime and anywhere in a small-sized mobile terminal 100 which can be conveniently carried. The electronic book, unlike a paper book, allows the user to quickly search, immediately modify or update information, and may include multimedia information such as audio or video in addition to text. Furthermore, the electronic book is more than a simple electronic document, such as a Word file, PDF file, or text file, but is a book configured such that digital rights management (DRM) is added thereto, to prevent illegal duplication and distribution. Moreover, the mobile terminal 100 may carry numerous volumes of electronic books based on the memory capacity in the mobile terminal 100.

Hereinafter, for the sake of explanation in this embodiment, the user interface (UI) for storing and managing the electronic books is referred to as a "electronic library." In the electronic library, additional information such as memo, bookmark, hyperlink, highlight, and the like that has been created by the user may be stored, in addition to the electronic books. A program for reproducing the electronic book is referred to as an "electronic book reader."

The electronic book reader may reproduce all types of information, such as text, sound, image, Internet link information, video, memo, highlight, bookmark, and the like, included in the electronic book. Furthermore, the electronic book reader may reproduce only a specific type of information, or on the contrary, may also reproduce information other than the specific type of information. As described above, it may be possible to set a play mode, such as a text mode, audio mode, image mode, text and audio dual mode, and the like, so as to control the output of a specific type of information, or it may be possible to switch the mode during playback. According to the type of an electronic book, the electronic book may be displayed or reproduced.

For example, in an audio electronic book that can be reproduced in the audio mode, a text electronic book may be reproduced by converting the text into audio using a Text-to-Speech (TTS) function, and the audio electronic book may be synchronized with the text electronic book. Alternatively, it is possible to download a file in which the text electronic book is synchronized with the audio electronic book or a special use audio file only for special use. It is also possible to download a file in which image, audio and text are synchronized with one another.

For the sake of convenience of explanation, it is assumed that the electronic book reader is set to the text mode in the following embodiment. The user can implement an electronic book reader and then select and reproduce a desired electronic book. In order to select the electronic book, for example, the user may perform the following process: "Call menu→Select import electronic book menu→Select a folder listing the electronic book→Display an electronic book list in the selected folder→Select a desired electronic book in the electronic book list." When the user's desired electronic book is selected as described above, the controller 180 retrieves the selected electronic book from the memory 160 and displays it on the screen of the electronic book reader.

Hereinafter, functions that can be implemented during the playback of the electronic book as described above will be described with reference to the accompanying drawings.

Figure 3B:
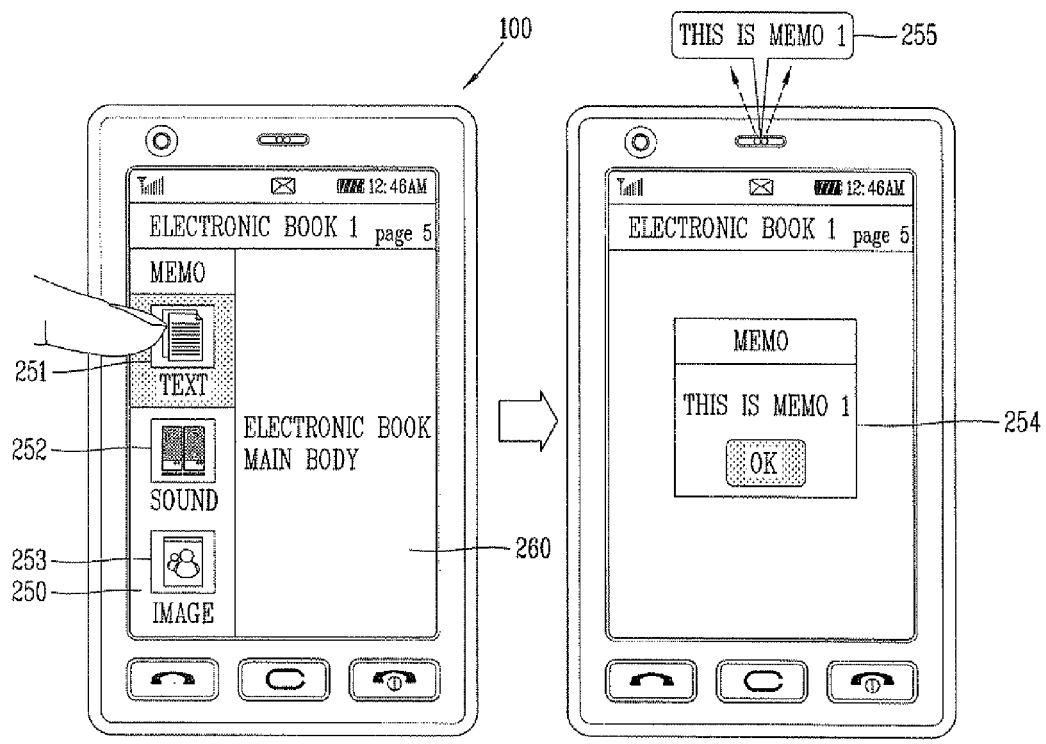
Figure 3C:
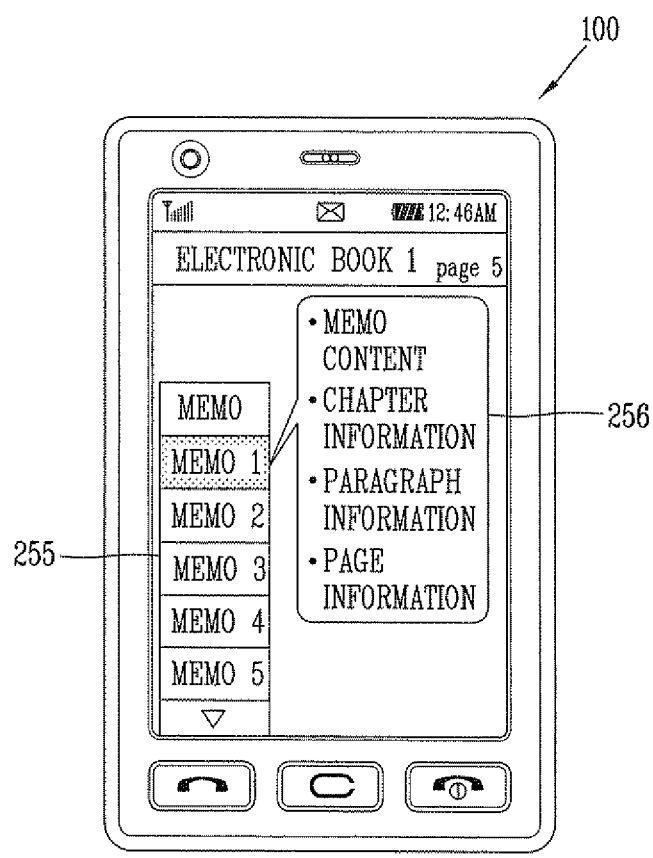

Referring to FIGS. 3A through 3C, a memo function of an electronic book reader according to an embodiment of the present invention is described. As described above, the user can input a memo while an electronic book is displayed. The memo may be entered as text via typing or handwriting recognition, for example, as a sound, via voice recording, for example, or as an image, via a still or motion image.

As illustrated in FIG. 3A, the user may select a memo input menu (210), and then set a memo input type from a menu listing, for example, text, sound, or image (220). Once the memo input type is selected (230), based on the selected input type, the controller 180 may activate a microphone 122 or camera 121, or display a pop-up window 240 for receiving text. When the pop-up window 240 is displayed, a soft keypad may also be displayed together on the same screen. The user may type a memo on the pop-up window 240 using the soft keypad, or input a memo in a cursive style using an arbitrary input means such as a pen. In response to the memo input, the controller 180 may store the received memo as additional information of the electronic book in conjunction with the electronic book.

When the memo is entered as a text type, it may be entered on a separate page. For example, a page for memo input may be inserted on a next page (e.g. page 6 when a current page is page 5 in an electronic book), as shown in FIG. 3A. Furthermore, the memo may be entered as different types at the same time. For example, the memo may be entered as video and text types such that a text input, by typing or handwriting, may be captured in video to be inputted as a memo.

When a memo is entered as described above, an icon indicating the type of memo may be displayed on the electronic book. For example, as illustrated in FIG. 3B, an icon 251 indicating a text memo may be displayed if the memo is text, an icon 252 indicating a sound memo may be displayed if the memo is sound, and a thumbnail 253 indicating an image memo may be displayed if the memo is a still or moving image. As described above, icons for selecting the type of memo are displayed on an icon display area 250 that is located next to the main display area 260 on which the electronic book is displayed. Alternatively, the icon display area 250 and the main display area 260 may be displayed in an overlay manner without being divided.

The screen of an electronic book reader can be divided for the memo icons, and therefore, the memo icons may be displayed on a side of the screen, and the main body of the electronic book may be displayed on another side of the screen. A memo icon may be displayed over a word or sentence having the memo from the main body of the electronic book. Part or all of the memo content may be displayed by overlaying it on the main body of the electronic book. The memo content may be dimly displayed, and then changed to be brightly displayed. Alternatively, the memo content displayed only in part may be clearly displayed when the memo content is selected by the user. As a result, when displaying an electronic book, the user can select whether to display the electronic book on the main body only, or include the memo icon and/or the memo content on the main body.

When an icon indicating the memo is selected by the user as described above, the memo content may be outputted in a manner that is suitable to the type of memo. For example, text is displayed on the pop-up window 254 if the type of memo is text as shown in FIG. 3B, a still or moving image is displayed on the pop-up window if the type of memo is an image, or sound is outputted through an audio output module 152 if the type of memo is sound. The transparency of the pop-up window 254 may be controlled. As a result, the pop-up window 254 may be displayed by overlaying it on the original content of the electronic book.

Furthermore, because the type of memo is classified as described above, the user may select and output his or her desired type of memo. For example, as illustrated in FIG. 3C, image type memos may be listed, and an image memo may be selected by the user to be displayed. Otherwise, text type memos may be listed, and a text memo may be selected by the user to be displayed. Listing of the memos 255 may be displayed as icons or displayed as abstracts of memos. Moreover, at least any one of the information 256, for example, chapter, paragraph, or page, associated with each memo may be displayed together therewith. Thus, a desired content of the main body may be easily retrieved with reference to the memo information.

In addition, the memo may be set as an idle screen or background screen of the mobile terminal 100. For example, the memo set as an idle screen or background screen may be overlaid on the existing background screen or idle screen. Transparency of the memo may be controlled in order to distinguish the memo from the existing idle screen.

Figure 4A:
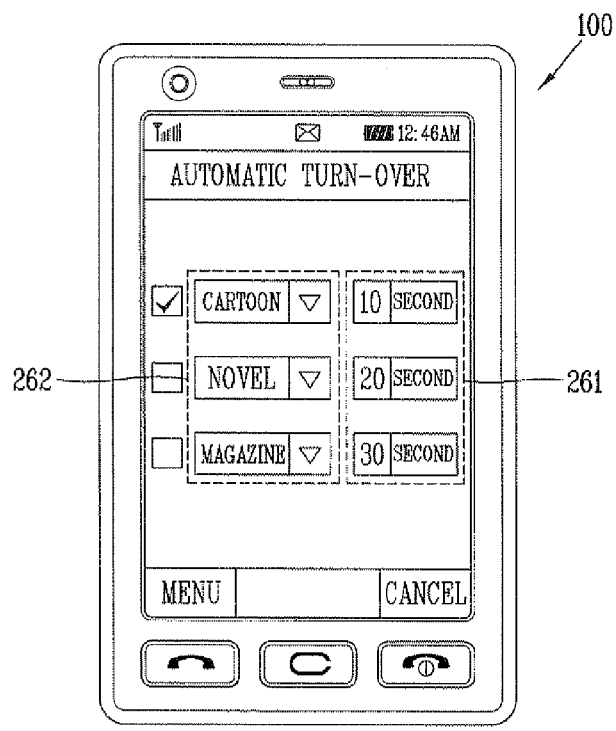
Figure 4B:
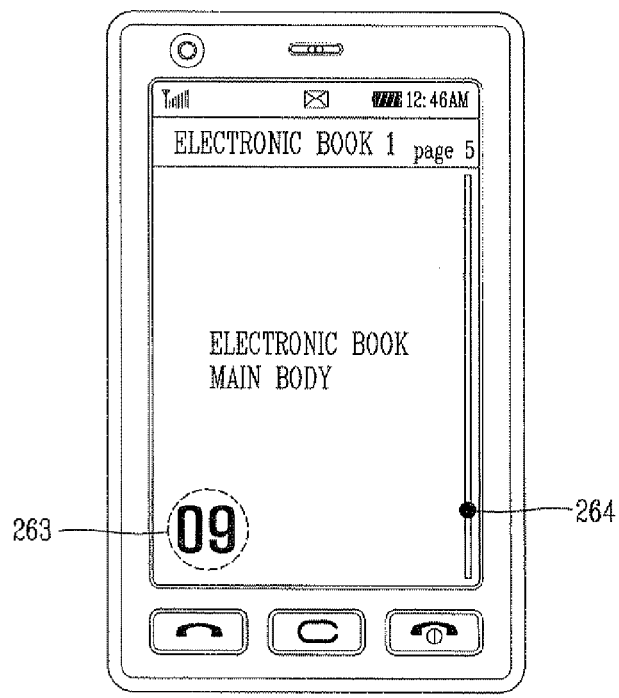

FIGS. 4A through 4C illustrate a page turn-over function of an electronic book reader according to an embodiment of the present invention. Typically, pages of the electronic book are manually turned over in response to a command, but may be also turned over automatically. However, because the user's speed for reading an electronic book may be irregular, if pages are turned automatically, the time provided between page turns may be insufficient for the reader to finish reading a current page. In this embodiment, a function for turning over pages in an electronic book compensates for the foregoing problem and will be described below.

As illustrated in FIG. 4A, the user may set an automatic turn-over option 261 prior to implementing the automatic page turn-over function. For example, when the automatic turn-over time is set to "10 second," the controller 180 automatically turns over pages of the electronic book every 10 seconds. The automatic turn-over time may be set differently according to the type of electronic book 262, for example, a cartoon, magazine, or novel.

When the automatic page turn-over function is implemented subsequent to displaying an electronic book as described above, the controller 180 may display the remaining time prior to turning over a page or may display the time elapsed subsequent to turning a page. For example, as illustrated in FIG. 4B, the time information, such as remaining time or elapsed time, may be displayed on a side, such as a side edge or a side surface, of the screen in an electronic book reader, and the location of displaying the time information may be changed by the user. The time information may be displayed by using a numeral 263 or animation image 264. Accordingly, the user can control his/her speed of reading with reference to the time information. For example, according to the remaining time, the user may try to read a page faster or slower within the remaining time.

In another embodiment, assuming that the animation image is a specific character, the character may be arranged on a side of the screen in an electronic book, and its movement may be set whenever pages are turned. Furthermore, the character may be moved from left to right or from top to bottom by associating the character with time counting information, thereby allowing the user to check the elapsed time and the remaining time simultaneously. Also, more than two characters may be arranged at different positions so that they come across each other at a specific position in conjunction with the time counting information.

In case the remaining time is insufficient to completely read the page, the user may suspend the automatic page turn-over function. Alternatively, in case the remaining time is more than necessary to read the page, the user may immediately turn over to the next page. For example, as illustrated in FIG. 4C, in case that the remaining time is insufficient, the controller 180 stops the time count (266) when the time count displayed on the screen is touched by the user (265). Then, if the touch is released, then the time count is restarted (267). When the restarted time count is completed, the controller 180 automatically turns over the page (268).

On the other hand, in case the remaining time is excessive even after the user has finished reading the page, the controller 180 can immediately run down the time count and turn over the page in response to a command, such as when a side of the screen is double-touched, for example. If the user manipulates page turn-over at his or her own discretion as described above, the automatic page turn-over function will not be deactivated.

The page turn-over function may be manipulated using a keypad or voice recognition as well as a touch method. For example, the page turn-over function may be manipulated by setting a key capable of implementing the same function as the touch. Also, the page turn-over may be manipulated using a command such as "next," "previous," or "page number." Further, the page may be set to turn over to the left, right, bottom, or top.

Figure 5:
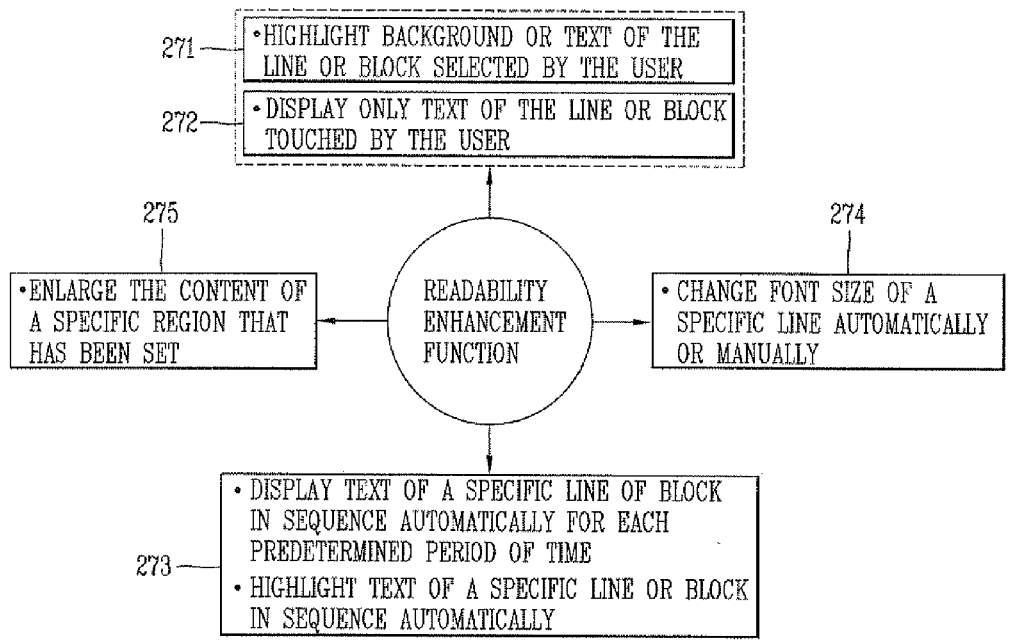
FIG. 5 illustrates a readability enhancement function in an electronic book reader in a mobile terminal according to an embodiment of the present invention.

Referring to FIG. 5, the electronic book reader according to an embodiment of the present invention may have a readability improvement function. Here, readability refers to an efficiency level of how easily printed matter can be read. Although the function of improving readability may not be applicable to a paper book once printed, but the function of improving readability is applicable to the electronic book. For example, readability may be improved by font-sizing, character-spacing, line-spacing, word-spacing, or highlighting. The functions for improving readability according to this embodiment will be described below.

According to an embodiment of the present invention, the background or text on the line or block touched by the user may be highlighted or distinctively displayed (271) when reading an electronic book. Here, the highlighting may be implemented by at least any one of underlining, changing the background color, changing font color, or font sizing.

According to another embodiment of the present invention, only the text corresponding to the line or block touched by the user may be displayed (272). For example, the line or block not touched by the user may be displayed dimly, and the line or block touched by the user may be displayed more clearly or brightly.

According to yet another embodiment of the present invention, even though not touched by the user, the controller 180 automatically displays or highlights the text corresponding to the line or block at each predetermined time interval (273). For example, assuming that the page turn-over time is 10 seconds and the text of the page is 10 lines, a specific line may be automatically displayed more clearly or brightly compared to the other lines in sequence every second.

According to yet another embodiment of the present invention, the font size of a specific line may be automatically or manually changed to a larger size to be displayed (274). When the font size is changed as described above, the text that cannot be displayed on one line may be automatically displayed on the next line. According to yet another embodiment of the present invention, a specific region may be magnified to be displayed (275), similar to viewing a book or paper through a magnifying glass. For example, a screen comparable to the size of a paper book may be configured and then a page thereof may be moved in all directions by detecting the movement of the mobile terminal 100 using a sensor, such as a gyro-sensor. The content positioned at the specific region can thereby be magnified to be displayed. An indicator indicating where the specific region is located within a page may be displayed. Moreover, when the mobile terminal 100 is rotated or tilted by the user, the controller 180 may rotate an electronic book in a horizontal or vertical direction based on the rotation angle or tilt angle and the direction of the mobile terminal 100.

Figure 6:
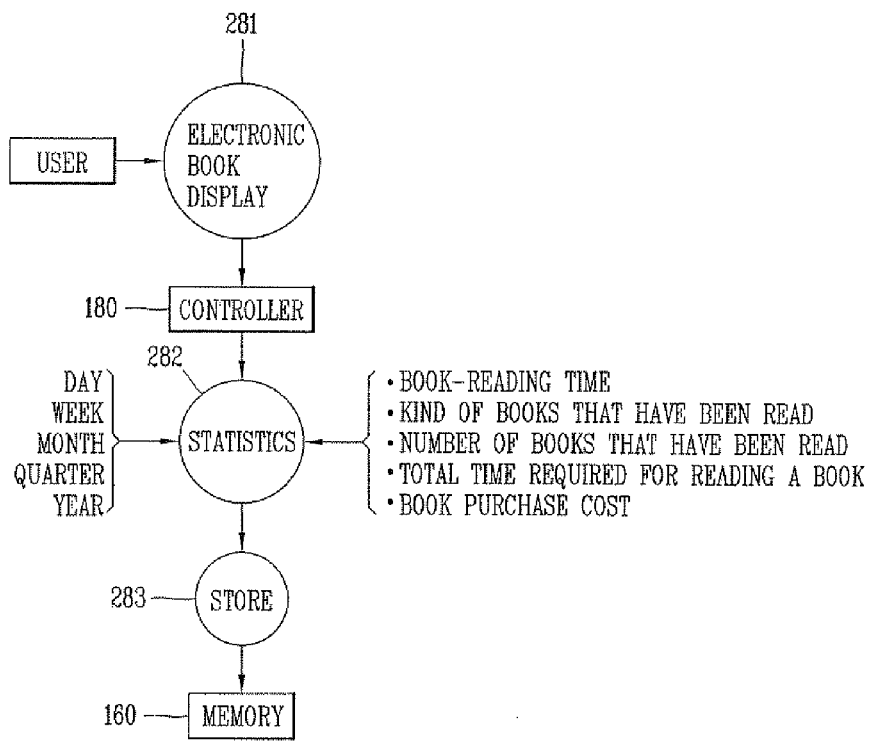
FIG. 6 illustrates a statistical function in an electronic book reader in a mobile terminal according to an embodiment of the present invention.

Referring to FIG. 6, a statistical function of an electronic book reader according to an embodiment of the present invention is described. Whenever an electronic book is displayed (281), the controller 180 may automatically obtain statistics such as "book-reading time," "kind of books that have been read," "number of books that have been read," "total time required for reading a book," or "book purchase cost" for a predetermined time unit, such as day/week/month/quarter/year (282). The statistics obtained as described above may be stored in a specific region of the memory 160 (283). Using the statistics, the user's usage of electronic books may be analyzed, and his or her reading plan may be set for a specific period.

Figure 7:
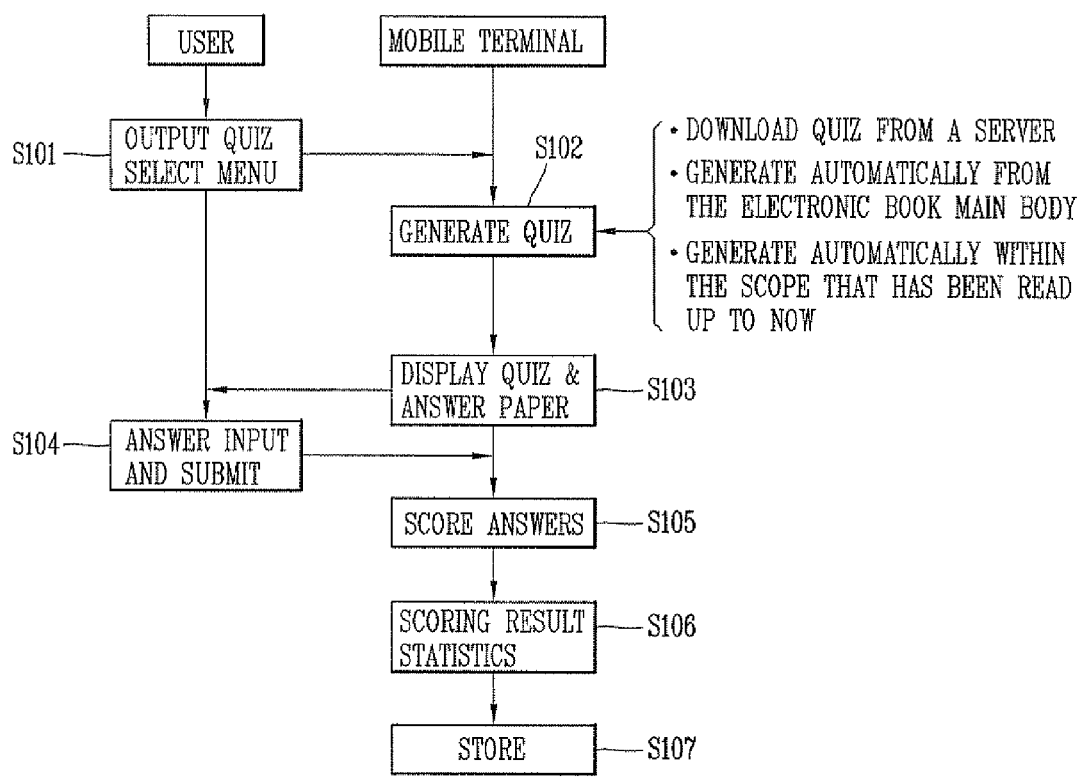
FIG. 7 illustrates a quiz function in an electronic book reader in a mobile terminal according to an embodiment of the present invention.

Referring to FIG. 7, a quiz function of an electronic book reader according to an embodiment of the present invention is described. The quiz function is a function for helping the user understand/retain the content of a book. The quiz may be generated from the content of a previously read electronic book or downloaded via the Internet.

In this embodiment, a method of automatically generating the quiz will be described below. For example, if a quiz menu is selected by the user (S101), then the controller 180 generates a quiz within the scope of an electronic book in which the user has read up to now (S102). Since the controller 180 does not have perceptual ability, it may be difficult to generate a high-dimensional quiz capable of measuring the user's understanding level. Accordingly, a quiz may be generated by selecting an arbitrary paragraph or sentence from the main body of the electronic book and then using parentheses for arbitrary words in the paragraph or sentence.

When outputting a quiz as described above, an answer paper such as an optical mark recognition (OMR) card may be outputted together therewith (S103). If the answer paper is filled out and submitted (S104), then the controller 180 scores the answers by comparing them with the correct answers (S105).

The scoring may be provided in conjunction with a quiz providing server. Furthermore, the scoring result may automatically generate statistics (S106). The generated statistics may be stored and then provided later as statistical data (S107). Accordingly, the user can assess his/her level of book reading understanding/retention using the quiz statistics.

Figure 8:
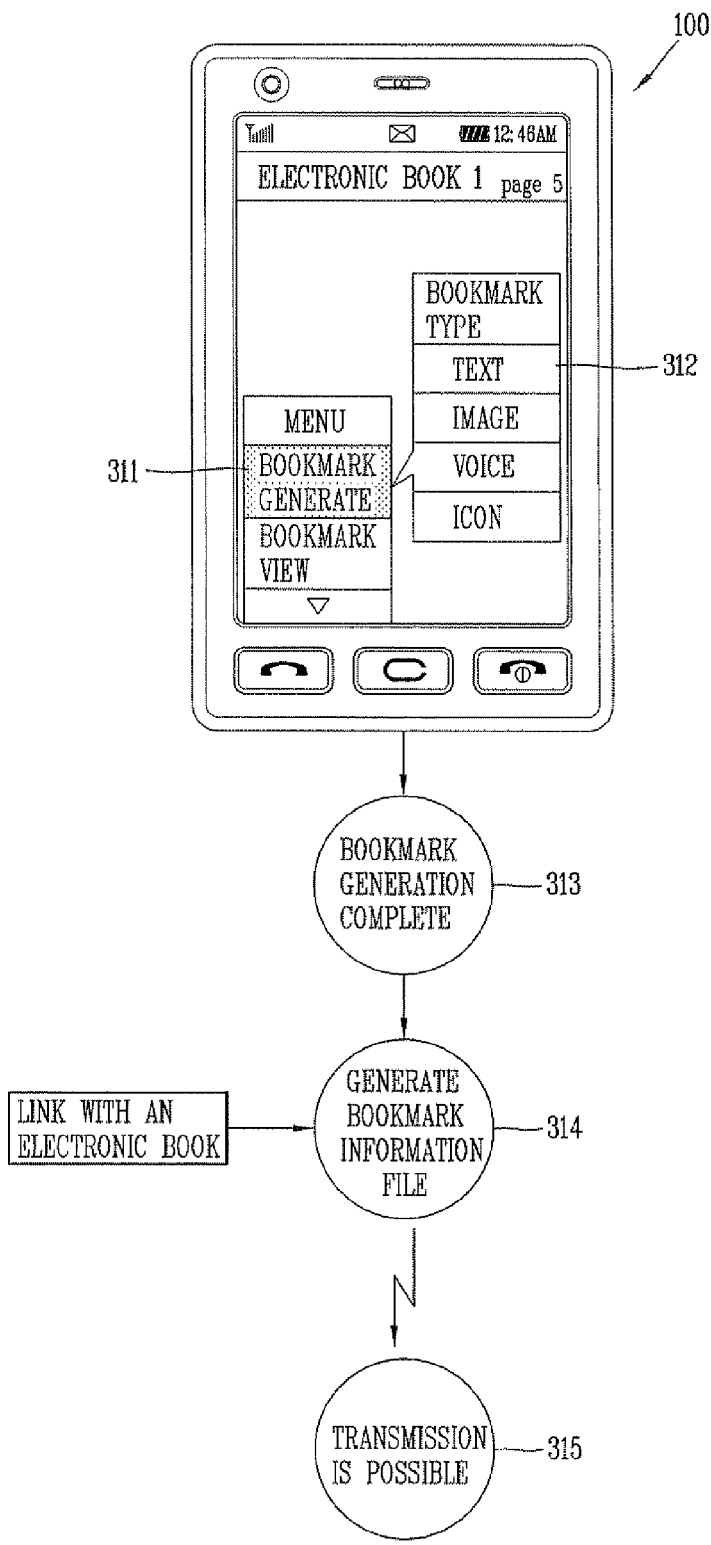
FIG. 8 illustrates a bookmark function in an electronic book reader in a mobile terminal according to an embodiment of the present invention.

Referring to FIG. 8, a bookmark function of an electronic book reader according to an embodiment of the present invention is described. The bookmark function is one of additional functions for enhancing the convenience of the user when reading an electronic book. The bookmark may be stored in a separate file and may be linked to the electronic book. For example, when displaying the electronic book, a bookmark file linked to the electronic book may be automatically retrieved and displayed together with the electronic book.

When a bookmark is created while displaying an electronic book (311), the bookmark may be generated by inserting multimedia contents such as text, image (still image or moving image), icon, and voice (312). For example, the electronic book reader may provide various forms of bookmarks as a default and a bookmark generation menu may be selected to generate a new bookmark in a bookmark form provided as the default. The bookmark may indicate a current page as well as a specific paragraph or line or a specific position in the current page.

When the bookmark is generated (313), the controller 180 may separately generate a bookmark information file linked to an electronic book (314). The separately generated bookmark file can be transmitted to another mobile terminal (315). Accordingly, when the electronic book linked to the transmitted bookmark file is displayed in another mobile terminal, the bookmark information may be displayed in the electronic book of another mobile terminal.

Figure 9:
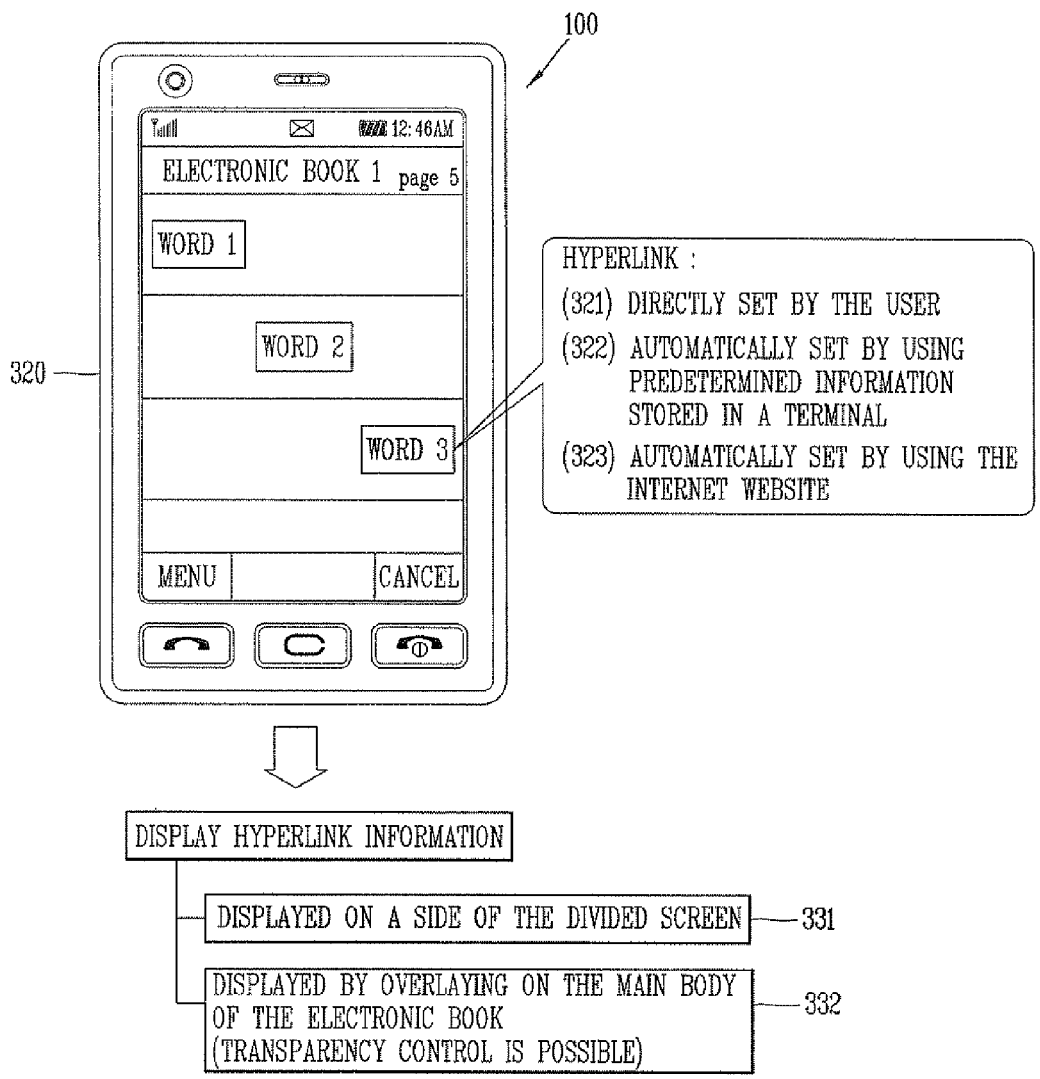
FIG. 9 illustrates a hyperlink function in an electronic book reader in a mobile terminal according to an embodiment of the present invention.

Referring to FIG. 9, a hyperlink function of an electronic book reader according to an embodiment of the present invention is described. The hyperlink function is one of additional functions for enhancing the convenience of the user while reading an electronic book. The hyperlink function may hyperlink a specific word selected by the user directly from the main body of the electronic book with related information (321), and may also automatically hyperlink by using a dictionary built in the mobile terminal 100 itself (322). Alternatively, automatic hyperlink is possible by retrieving a dictionary provided by a specific website, such as a dictionary website, indicated through the Internet (323).

The word set with the hyperlink may be displayed distinguishably from the rest of words that are not linked on the main body of the electronic book. Furthermore, the controller 180 may list words that are set with the hyperlinks on a side of the screen in a collective manner. Therefore, if any one of the listed words is selected by the user, the controller 180 may display a page including the selected word as well as the information linked to the word. The linked information may be displayed on a side of the divided screen (331), or displayed by overlaying it on the main body of the electronic book (332).

An electronic book reader associated with the mobile terminal 100 according to an embodiment of the present invention may further include additional functions for enhancing the convenience of the user in addition to the foregoing functions. For example, though not shown in the drawings, the background color or background design on the cover or main body of the electronic book may be changed when the main body content of the electronic book is maintained. Further, the volume may be checked according to the tilt direction and tilt angle of the mobile terminal 100 using a gyro-sensor or the like. Furthermore, it may be possible to directly make a phone call, search the Internet, or send an email while viewing a catalogue including, for example, a firm name, phone number, email, and the like. Also, color information may be extracted while reading an electronic book such as a magazine. The color information may be provided to the user who is interested in color. Furthermore, distance and height information may be displayed by using a map contained in the electronic book. The distance and height may be outputted by converting a length dragged on the display by the user for a destination point into an actual distance and height using a scaled map of the electronic book.

Additionally, current location information may be provided when displaying or reproducing an electronic book. For example, it may be outputted that page 44 is currently being displayed in an electronic book constituting a total of 100 pages In another example, it may be outputted that a 5-minute section is currently being reproduced in an audio electronic book constituting a total of 10 minutes. Preferably, while viewing/hearing an image/audio book, a scroll bar may be displayed on the image or an audio voice guide may be provided to inform the user of his or her reading speed in the image/audio book. Alternatively, it may be preferable to display page information on the image.

Furthermore, in case that an electronic book reader function is shut down and implemented again by the user, the page last displayed at the time of shutdown may be automatically re-displayed. For example, when the electronic book 1 is shut down while reading page 44, and subsequently reactivated by the user, the controller 180 automatically moves to page 44 to display the same page. Similarly, when the electronic book is shut down while reproducing the 5-minute section of an audio book and subsequently reactivated by the user, the controller 180 automatically moves to the 5-minute section of the audio book to play the section. The function of automatically opening to the last page read when shutting down an electronic book reader may be referred to as an automatic opening function. It may be also possible to manage the history of all the electronic books read at least once by the user. Accordingly, if an electronic book that has been read at least once by the user is read again, the portion of the book last read at the time of shutdown will be automatically opened.

All of the foregoing embodiments may be applicable to all modes such as text mode, audio mode, and text & audio dual mode.

In one embodiment, in case that the "electronic library" function is implemented, the controller 180 may display an electronic book list that can be read by the user. For example, the electronic book list may include at least one of (1) a list stored in the memory of the mobile terminal 100, (2) a list that is kept in an "electronic book purchase server," (3) a list stored in another shared mobile terminal, (4) a list of gifts that have been sent or will be sent, and (5) a list of gifts that have been received. Furthermore, if there exists any electronic books that have been lent to or from others, a list of books that have been lent to or from the others may be displayed. In addition, it may be possible to display an electronic book list in which types or characteristics of electronic books are classified to be viewed by the user, which will be described in more detail with reference to the accompanying drawings.

The "electronic book purchase server" manages electronic book lists for each electronic book purchaser, and therefore, the user may access the electronic book purchase server at any time and a place where the Internet is available to read an electronic book purchased by himself or herself. The user may download and manage the electronic book in a mobile terminal 100, or alternatively may keep and manage it in the electronic book purchase server.

Means for protecting a copyright in a typical electronic book are provided. For example, electronic books are set in such a manner that content reading is allowed but the content cannot be duplicated. Therefore, if there is a portion to be quoted from the content of the electronic book, the user should manually type words, sentences, or paragraphs corresponding to the portion of the content.

The present invention allows the user to extract specific content of the electronic book without infringing the copyright. Here, extraction refers to a function of selecting and copying the user's desired part from the content of a book or article, which may be different from a search operation that checks whether or not a specific word or sentence is included in the content.

Referring to FIGS. 10A through 10D, a method of extracting specific information of an electronic book reader in a mobile terminal 100 according to an embodiment of the present invention is described. As illustrated in the drawings, if any electronic book is selected by the user, then the controller 180 displays the electronic book selected by the user.

Figure 10A:
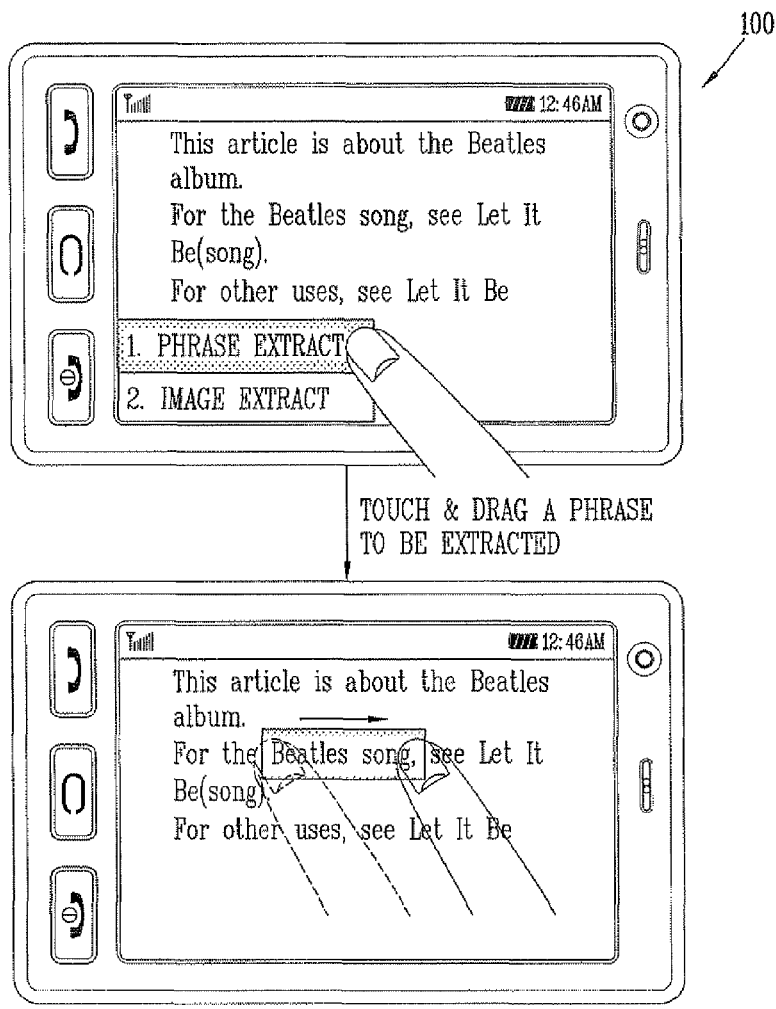
FIGS. 10A through 10D illustrate a method of extracting specific information from an electronic book reader in a mobile terminal according to an embodiment of the present invention.

The user may select his or her desired content from the electronic book. For example, as illustrated in FIG. 10A, the desired content may be selected by dragging from a start point of the portion to be extracted, for example, a specific word or phrase, to the end point of the portion to be extracted or multi-touching the start point and the end point at the same time. Upon releasing the touch, the selected portion may be immediately extracted. Alternatively, upon releasing the touch, the selected portion may be highlighted, and then the highlighted portion may be extracted in response to the user's command. Otherwise, if the foregoing extraction is made, then the extracted portion may be immediately stored automatically, or may be stored in response to the user's command.

Figure 10B:
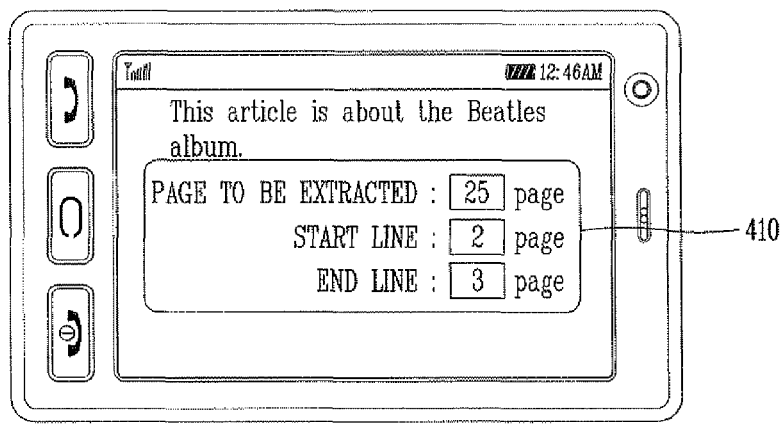

Referring to FIG. 10B, the portion to be extracted from the electronic book may be selected by directly inputting the page number, start line number, and end line number including the content to be extracted. If the content to be extracted is selected by the user as described above, the selected portion may be highlighted. Then, the highlighted portion may be extracted in response to the user's command for extraction. Otherwise, the portion that has been extracted as described above may be immediately stored automatically, or may be stored in response the user's command for storage. When the storage operation is completed, the highlighting may automatically disappear. For this purpose, the controller 180 may display a window 410 for receiving the information such as page number, start line number, end line number, first word of the start line, and/or last word of the end line.

If the type of information is not predetermined, the extraction may be restricted. For example, it may be possible to extract the information having a text type, but extraction of the information having a multimedia type, such as image or audio, may be restricted.

Figure 10C:
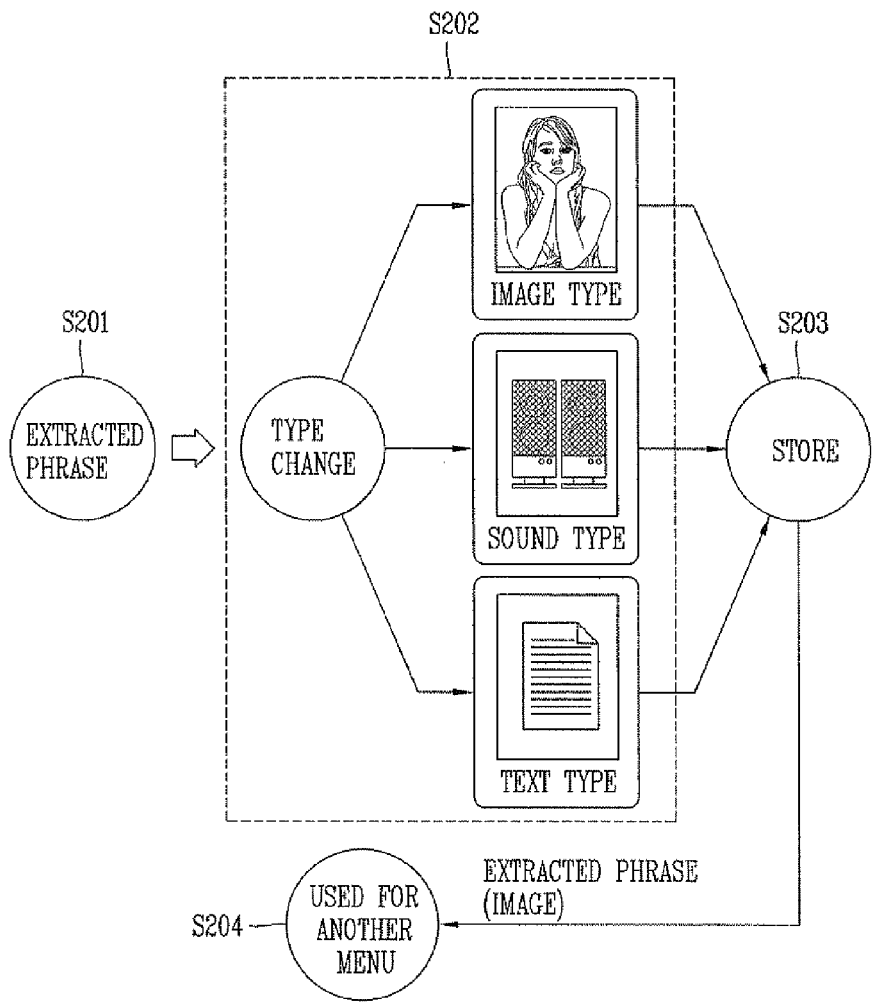

Furthermore, as illustrated in FIG. 10C, when a specific phrase is extracted from an electronic book (S201), the type of the extracted information may be converted to a different type of information (S202). For example, if text type information has been extracted from the electronic book, it may be converted to image type information such as a JPEG file which is not a text type, or the extracted information may be converted to audio type information using a text to speech (TTS) function, or the audio type information may be converted to text type information using a sound to text (STT) function. The phrase extracted as described above may be stored as the converted type of information (S203), and the stored phrase may be used for another application, for example, a menu provided in the mobile terminal 100 (S204).

Furthermore, if the extracted portion is selected as described above, then the controller 180 may highlight the selected portion based on a predetermined method. For example, at least one of brightness, color, font type, or font size may be changed, or arbitrary information such as underlining may be added thereto.

With regard to the portion to be extracted, the amount of the portion to be extracted may be limited per extraction to protect the copyright. For example, the extraction may be limited to sending one short message service (SMS), for example, up to 80 bytes, or limited to one paragraph of the electronic book regardless of the size of the data corresponding to the one paragraph. If the portion to be extracted is image or video data, then the amount of the extracted portion may be allowed up to the capacity capable of sending one multimedia message service (MMS).

If the extracted portion is selected as described above, then the controller 180 may temporarily store the extracted content in an arbitrary region of the memory 160. The temporary storage operation may be immediately and automatically implemented in the controller 180 when the extracted portion is selected or implemented in response to the user's command.

The content extraction and temporary storage operation may be consecutively implemented in the absence of a command. When the content extraction is consecutively implemented as described above, the controller 180 may temporarily store the extracted content based on the order thereof, and as illustrated in FIG. 10D, the temporarily stored information may be managed in a table form.

In addition, the extracted phrase may be applied to another electronic document or electronic book. When the extracted phrase is applied, it may be retrieved and pasted based on the temporarily stored order, or the table may be retrieved and then any one of the extracted phrases in a list displayed on the table may be selected to be applied to another electronic document or electronic book. After the extracted phrase is sent or applied, or used otherwise, or when the relevant electronic book reader is powered off, it may be preferable that the relevant phrase is automatically deleted from the table or automatically deleted after the usage period for the relevant electronic book expires.

Figure 10D:
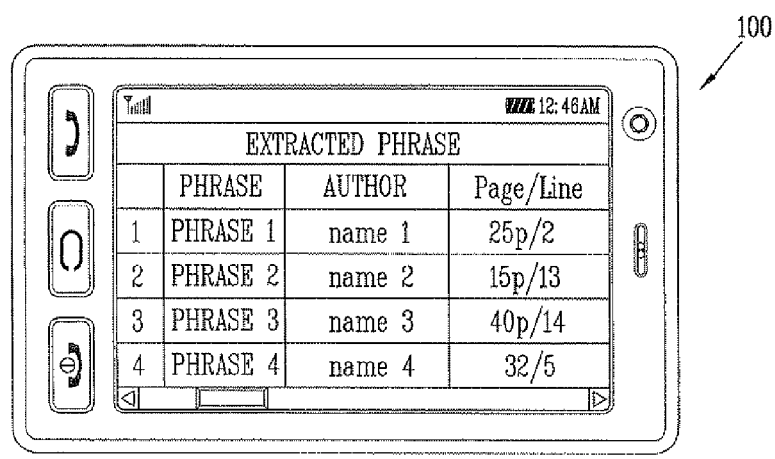

Furthermore, as illustrated in FIG. 10D, the controller 180 may additionally manage copyright information related to the extracted phrase. For example, the copyright information related to the extracted phrase may include any one of "name of the author," "title of the book," "location of extracted phrase (for example, page or line)," "publisher," or "guide statement related to copyright protection." When the extracted phrase is sent or applied, the copyright information may be automatically included in the sent/applied phrase. The copyright information may be displayed on the screen, or simply included in the sent/applied phrase as hidden information without being displayed. In other words, even if the copyright information is not displayed on the screen, it may be included in any one of information fields constituting an electronic file corresponding to the extracted phrase that is sent or applied to another application.

Figure 11A:
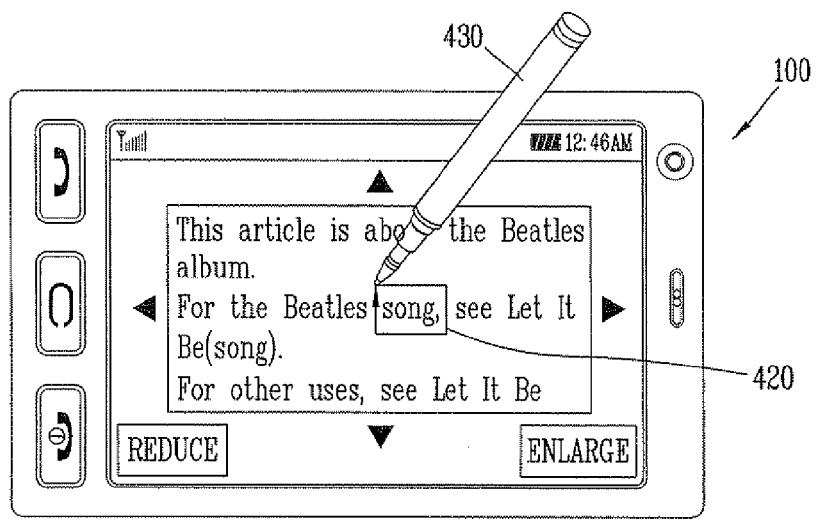
FIGS. 11A and 11B illustrate a method of extracting specific information from an electronic book reader in a mobile terminal according to another embodiment of the present invention.
Figure 11B:
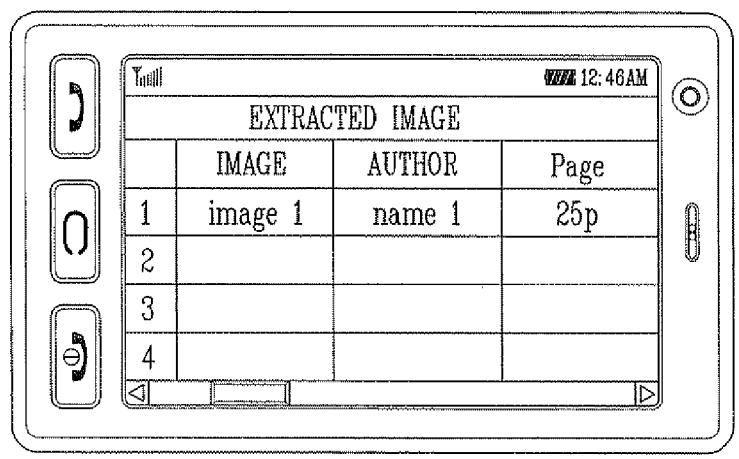

Referring to FIGS. 11A and 11B, a method of extracting specific information of an electronic book reader in a mobile terminal 100 according to another embodiment of the present invention is described. The user may select a method of extracting a desired phrase from an electronic book through a menu. For example, the phrase may be selected and extracted as a text type, an image type, or a multimedia type such as video or audio. The controller 180 may display a selection menu for allowing the user to select an extraction method.

Assuming that the user selects and extracts the phrase as an image type, the controller 180 may convert the selected content of the electronic book into an image type. For example, all pages of the electronic book may be converted into an image, or a specific page of the electronic book, for example, a current page or specified page may be converted into an image.

When the content of the electronic book is converted into an image type, it may be difficult to discern and extract words or phrases from the background because both the background and content of the electronic book are images. Accordingly, in this embodiment, some contents of the electronic book may be extracted by specifying an arbitrary region to be captured.

As illustrated in FIG. 11A, if the user specifies a region 420 surrounding a portion including the user's desired contents, then the controller 180 captures the entire area of the portion, including the content portion and background portion, within the region. Consequently, according to this method, the background portion may be included based on the shape or size of the region specified by the user. Accordingly, the type of the extracted information is an image.

The user may draw a line to form a box or ellipse using a pointer 430, such as a pen, to specify the region to be extracted. The controller 180 may display a region of the information to be extracted by highlighting the box or ellipse drawn by the user or an inner portion of the line. On the other hand, the electronic book that has been changed into an image type as described above may be enlarged, reduced, or moved to facilitate the extraction.

The user that has selected a region to be extracted as described above may select a menu for executing the extraction. Accordingly, the controller 180 may temporarily store the extracted image in the memory 160, and as illustrated in FIG. 11B, the extracted image may be managed in a table form along with the related copyright information based on the order of extraction. The table may have a plurality of extracted regions in various types including a text or image type, as described in FIG. 10D. Any one of the extracted information listed in the table may be selected and applied to a different electronic document or electronic book. When the extracted information is applied to the different electronic document or electronic book, the copyright information may also be automatically applied together with the extracted information by being included therein.

Hereinafter, methods for using the information extracted from the electronic book will be described.

Figure 12A:
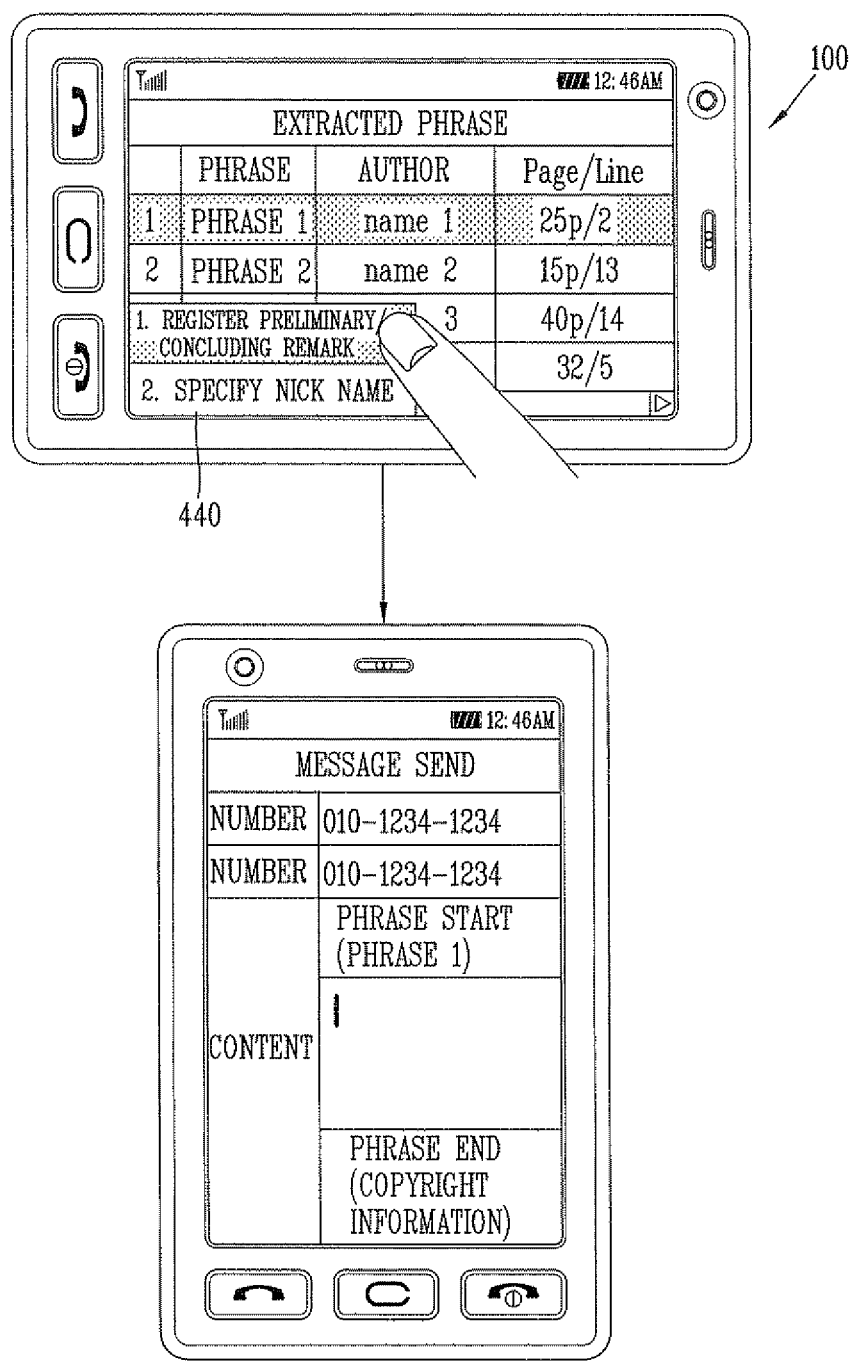

Referring to FIGS. 12A through 12F, using the information extracted from an electronic book in a mobile terminal 100 according to an embodiment of the present invention for a message transmission is described. As described above, it is assumed that a table listing an extracted phrase is retrieved from the memory 160. The user may select at least one extracted phrase or information from the table. Furthermore, as shown in FIG. 12A, when selecting a menu, a sub-menu list 440 is displayed. For example, the sub-menu list 440 may include a menu for registering the selected extracted phrase as a preliminary or concluding remark of a message, specifying the selected extracted phrase as a nickname, or sending the selected extracted phrase as a message in SMS, MMS, and the like, or using the selected extracted phrase as a bookmark of the relevant electronic book.

As illustrated in FIG. 12A, assuming that an extracted phrase, for example, phrase 1, is selected by the user, and a menu for registering the extracted phrase as a preliminary or concluding remark of a message is selected, the controller 180 automatically implements the relevant function such as message transmission. Then, the selected extracted phrase is automatically entered into the preliminary and concluding remarks of the content that can be entered in the message. At this time, when entering the selected extracted phrase, the related copyright information may be entered together therewith. Further, the entered phrase may be displayed and the user may additionally input composed text of the message along with a counterpart's phone number to send the message to the counterpart. In one aspect of the invention, the content that has been transmitted to another terminal is prohibited from being retransmitted in order to protect the copyright of the electronic book.

Figure 12B:
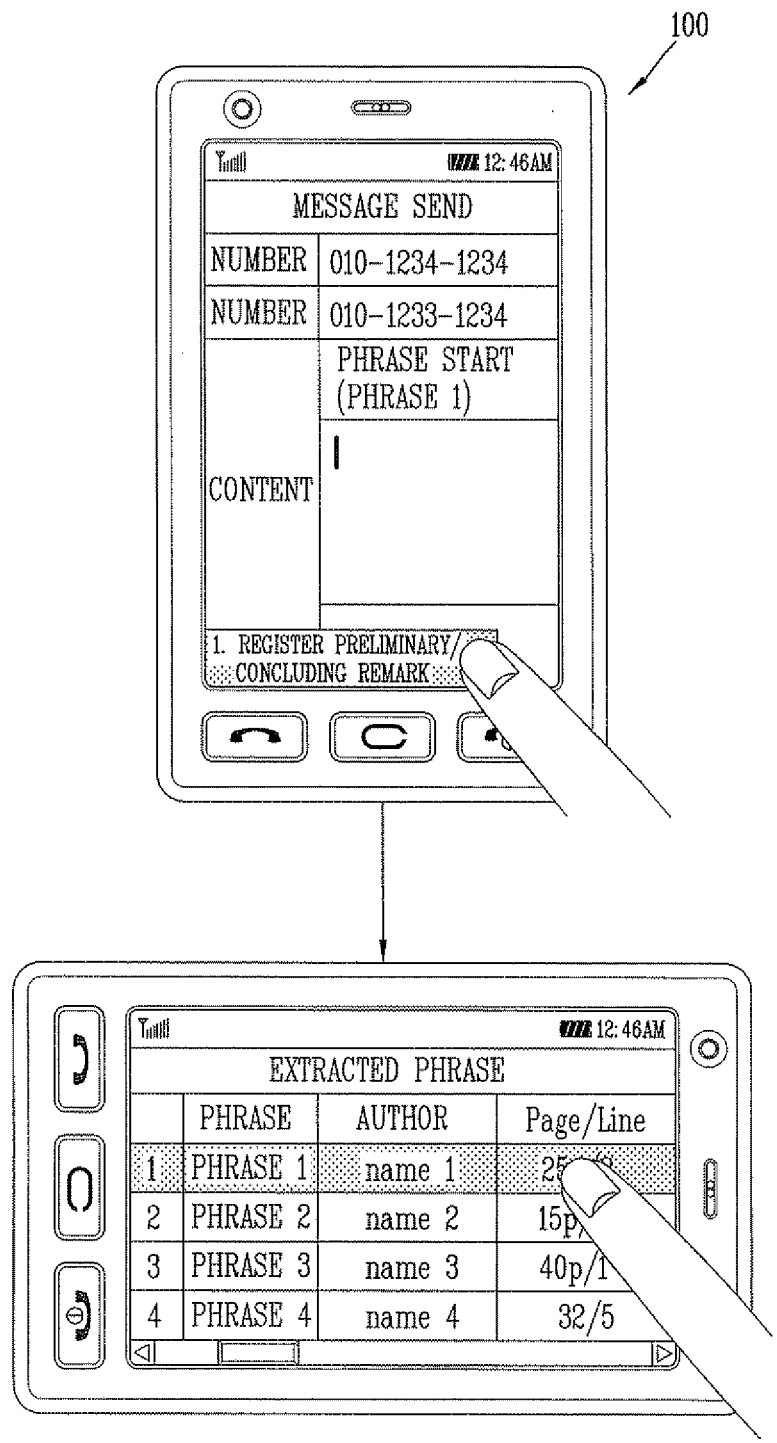

Alternative to the embodiment disclosed in FIG. 12A, as illustrated in FIG. 12B, a message transmission function may be implemented before the extracted phrase is selected from the table. For example, a message window is displayed first, and then, the menu for registering a preliminary or concluding remark may be selected to retrieve a table listing the extracted phrase such that the extracted phrase, for example, phrase 1, is selected from the table and entered to the message.

Figure 12C:
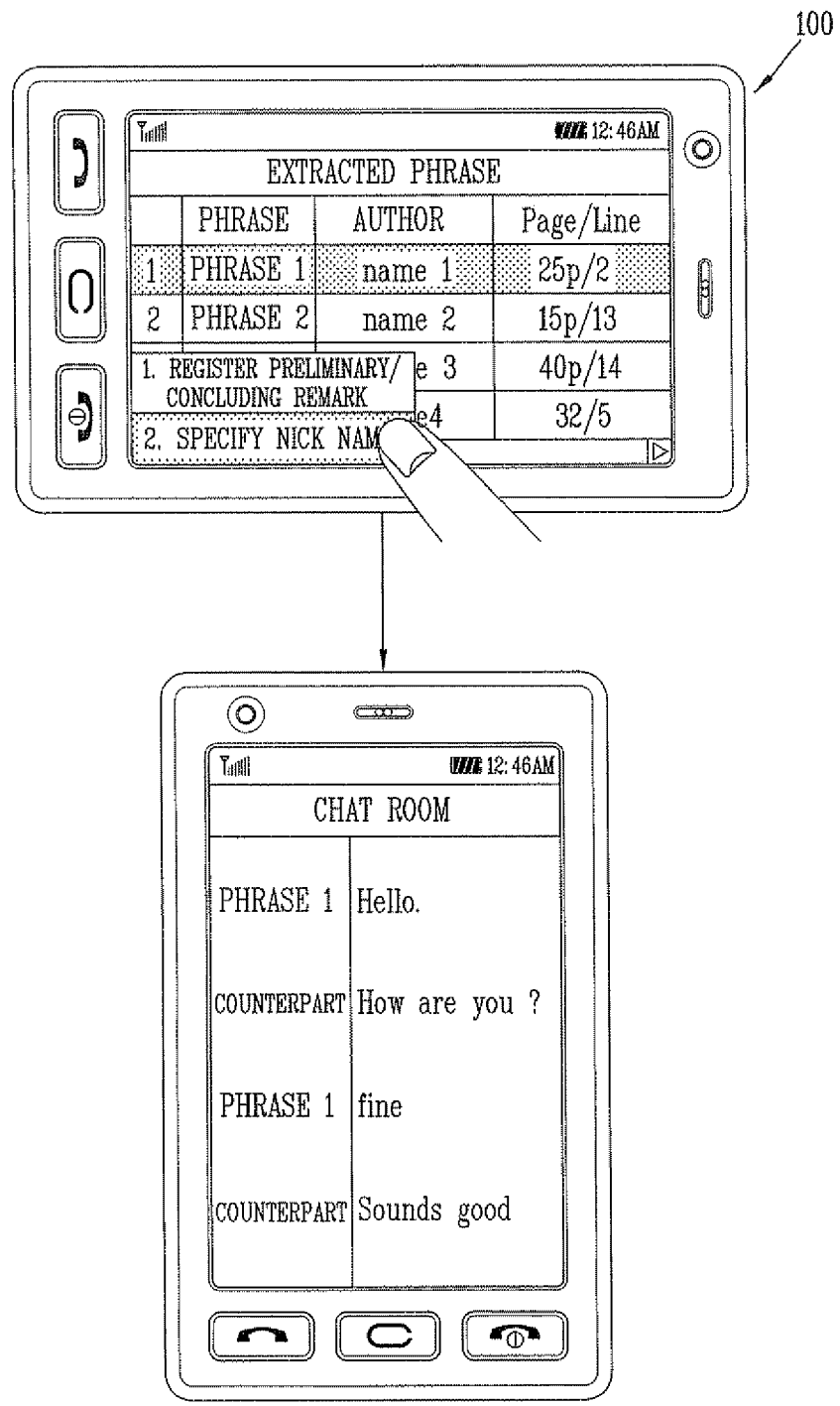

According to another embodiment of the present invention, as illustrated in FIG. 12C, assuming that the extracted phrase, for example, phrase 1, is selected by the user and the menu for indicating the extracted phrase as a nickname is selected, the controller 180 automatically implements the relevant function such as a messenger function. Then, the selected extracted phrase is automatically entered as a nickname of the user for the messenger function.

According to yet another embodiment of the present invention, as illustrated in FIG. 12D, a messenger function may be first implemented, and then the menu for indicating or changing a nickname may be selected to retrieve a table listing the extracted phrase. Thereafter, any one extracted phrase may be selected from the table to replace or update the current nickname used in the messenger function.

Figure 12E:
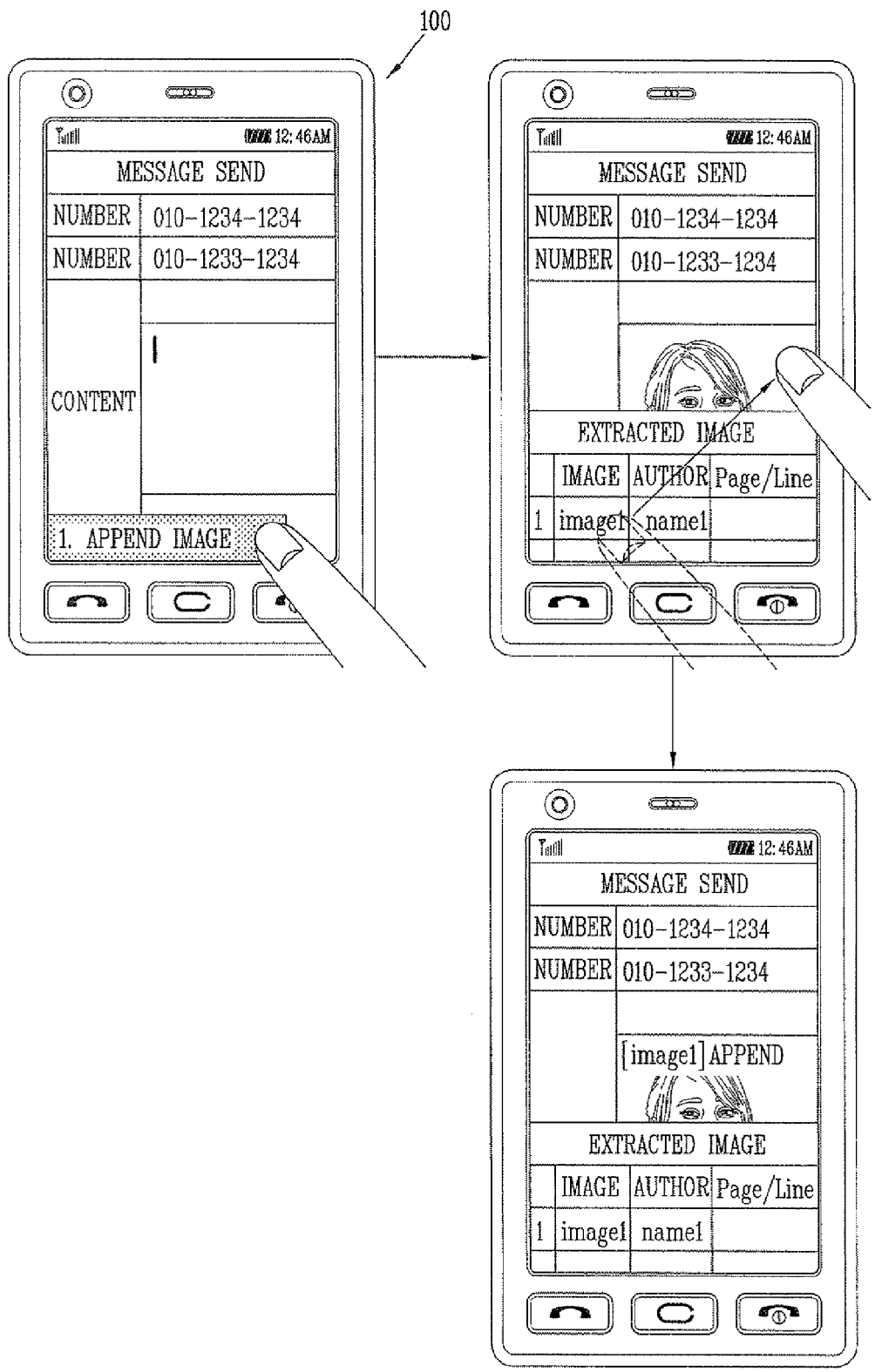

According to yet another embodiment of the present invention, as illustrated in FIG. 12E, if the extracted information in the table is an image type, the extracted information selected from the table may be added in the message transmission menu. In other words, since the extracted information is an image, it may not be entered in the content field of the message but may be appended as an image file. The appended extracted information in the image type may also include relevant copyright information. Thus, the message may be transmitted with the appended image information with the relevant copyright information being included in the appended image information.

Figure 12F:
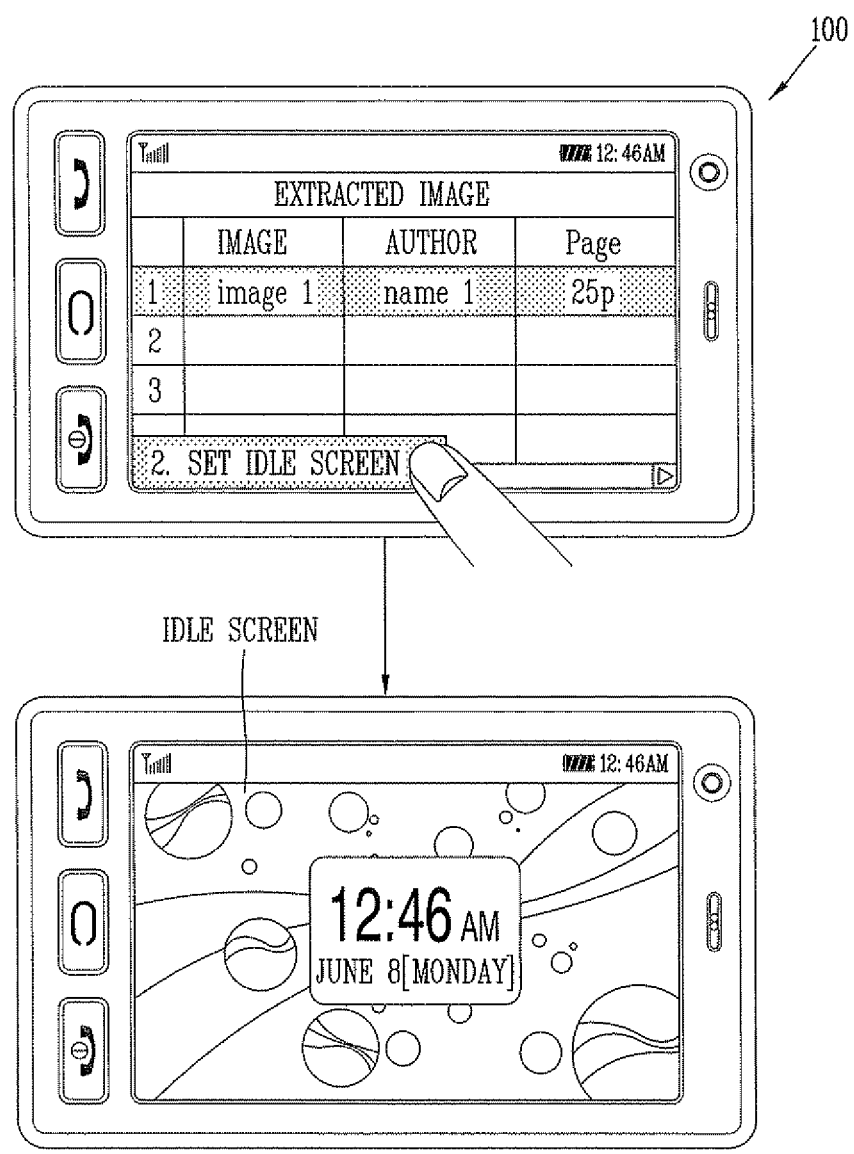

According to yet another embodiment of the present invention, as illustrated in FIG. 12F, if the extracted information in the table is an image type, then the extracted information selected from the table may be set as an idle screen. At this time, the extracted information set as the idle screen may be enlarged according to the screen size, or disposed at a portion of the screen, for example, a center or side edge of the screen, while the original size is maintained. The disposed location or enlarged size may be set by the user.

Here, a sub-menu list using the extracted phrase may be further added based on the mobile terminal. For example, a menu for duplicating the extracted phrase selected from the table may be added thereto. Furthermore, the duplicated extracted phrase may be applied to another electronic document or electronic book by implementing the duplication menu.

Figure 13A:
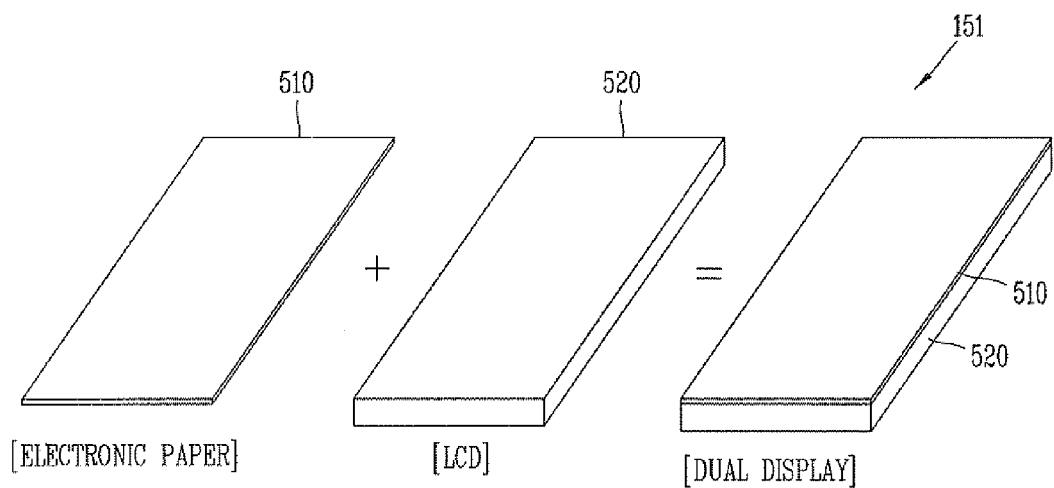
FIGS. 13A and 13B illustrate a configuration of a display unit used in an E-book in a mobile terminal according to an embodiment of the present invention.
Figure 13B:
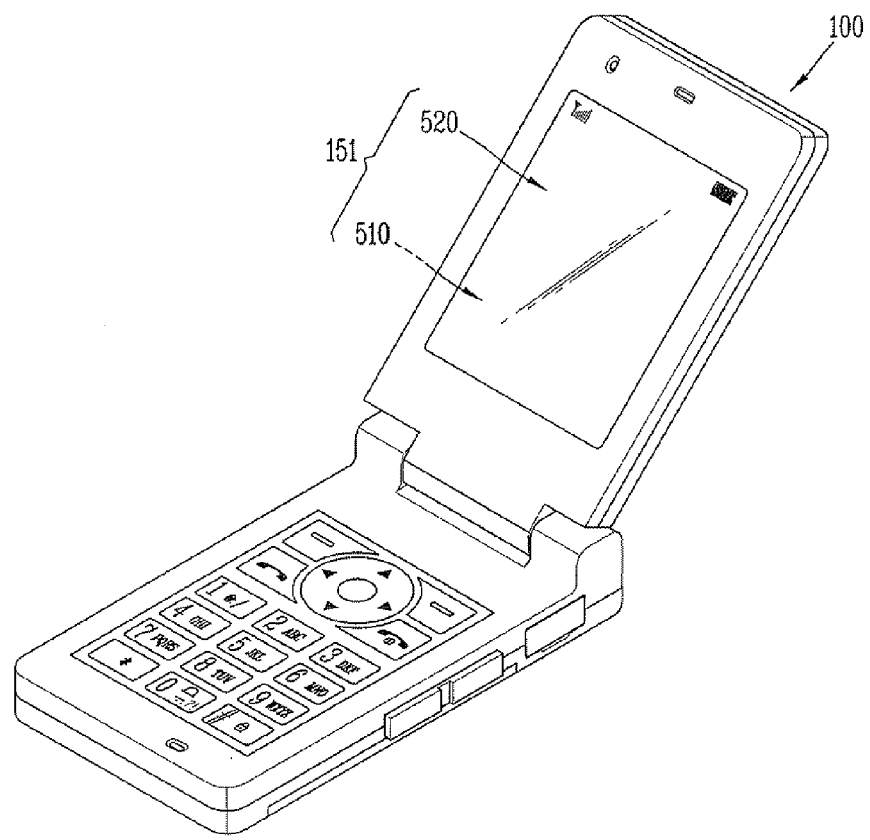

In an electronic book or digital book, electronic paper (E-paper) may be used as a display means to provide an experience similar to reading a paper book. The E-paper may be applicable to a display unit 151 of the mobile terminal 100. The display unit 151 may be configured with a single LCD (first display) or E-paper (second display), or may be configured with an integrated dual display having E-paper 510 at a front or rear surface of an LCD 520 as illustrated in FIG. 13A. Such an integrated dual display may be disposed on one surface of a folder of the mobile terminal 100 as shown in FIG. 13B. Further, the display unit 151 may be configured by including a touch panel. Alternatively, the display unit 151 may be configured with a double display form having an LCD 520 and an electronic paper 510 at front and rear surfaces, respectively, of the folder.

Using the integrated dual display, the extracted phrase may be displayed by turning power on at least one of the touch panel or LCD 520 when they are in a lockout state, and the content of the relevant extracted phrase may be periodically updated when the lockout state is sustained. In this case, in addition to the content of the extracted phrase, it may be preferable to additionally display status icons associated with an antenna, battery, message, incoming mode, alarm, and the like, which are basic items displayed on an idle screen of the mobile terminal 100. The relevant icons may accomplish low power consumption, which is an advantage of the E-paper, even when displayed together with the extracted phrase because a status of the icons are not changed frequently. Moreover, the icons are changed based on signal intensity, incoming message, or set alarm.

In the following embodiment, the display unit 151 configured with a dual or double display will be described. Notably, E-paper reduces eye-fatigueness and power consumption in comparison with an LCD when reading the electronic book. Thus, the controller 180 may display the E-paper when reproducing the electronic book and display the LCD when reproducing other information or contents such as a low battery alarm, incoming call or message alarm. In other words, the controller 180 controls the activation/deactivation of the E-paper or LCD based on the type of reproduced content.

While the activation/deactivation of the LCD and E-paper can be controlled at the same time, the LCD may be activated to display information that cannot be displayed on the E-paper, and the E-paper may be activated to display information that can be displayed on the E-paper. For example, information that can be displayed on the E-paper, such as an idle screen, may be displayed on the E-paper by turning on the E-paper for a preset period of time, for example, 1-second, 3-second, or 10-second, and a phrase extracted as described above may be displayed on the E-paper for the preset period of time, or a phrase list extracted from the table may be updated with a period of the specified time. When the preset period of time passes, the E-paper may be automatically turned off. Therefore, the LCD is substituted with a more energy-efficient display means such as the E-paper based on the content and circumstance, thus saving power and allowing longer battery life.

Figure 14A:
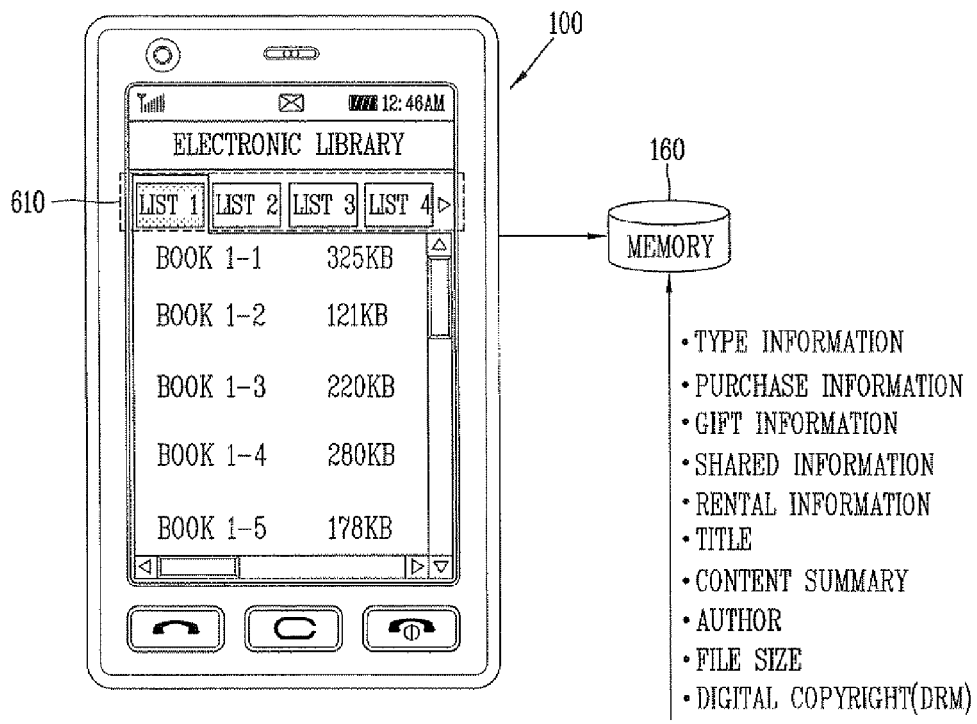
FIGS. 14A and 14B illustrate an electronic library in a mobile terminal according to an embodiment of the present invention.
Figure 14B:
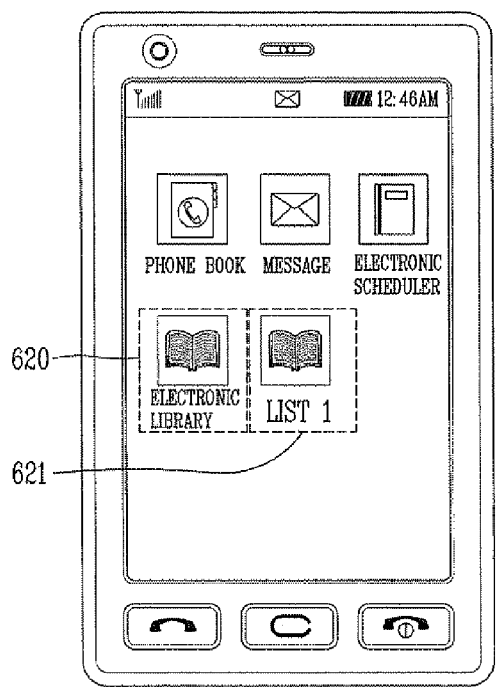

Referring to FIGS. 14A and 14B, an electronic library in a mobile terminal 100 according to an embodiment of the present invention is described. The user may implement an "electronic library" function by manipulating a menu or key, or via a voice command or touch input. When the electronic library is implemented, the controller 180 may display the electronic book list using an image, such as a library image, bookshelf image, or paper book image, or text.

Accordingly, the user can select his or her desired electronic book from an electronic book list in the electronic library. The electronic book list may be displayed when a widget icon in the idle screen is selected even when the electronic library is not implemented. The widget icon may be generated directly by the user, or automatically generated by the controller 180.

As illustrated in FIG. 14A, various supplementary information, such as type information (purchased, shared or rented), purchase information (purchase date, purchase price, purchase place), gift information (gift sender, gift send date), shared information (shared person, shared period), rental information (lender, rental period), title, content summary (synopsis), author, file size, and the like, may be stored in the memory 160. Thus, when the user searches for the electronic book or arranges the electronic book list, the controller 180 may use the supplementary information stored in the memory 160. The controller 180 may also display a menu or search window capable of retrieving the supplementary information.

When the electronic library is implemented, the controller 180 may display an entire electronic book list stored in the memory 160. Furthermore, the electronic books are classified based on the preset option to display the list 610. For example, the preset option may include at least "electronic book recently read," "electronic book currently reading," "electronic book not read yet," "electronic book stored in the terminal," "electronic book stored in the server," "electronic book borrowed," "electronic book being borrowed," "electronic book given as a gift," or "electronic book received as a gift."

The purchased books, read books, and the like may be stored in a separate region of the mobile terminal 100 and the related information may be stored in a server such that it can be downloaded from the server and stored in a new terminal when the mobile terminal 100 is switched with the new terminal by the user. Then, the user of the mobile terminal 100 or new terminal may be notified when there is a previous purchase or read history during the purchase process. Accordingly, even if the electronic book content itself is deleted from the mobile terminal 100 or the mobile terminal 100 has been switched with the new terminal, the user may be able to confirm the previous purchase or read history and avoid a duplicate purchase.

As illustrated in FIG. 14B, the electronic library 620 and each electronic book list 621 may be displayed with widget icons on the idle screen. The user can select a desired electronic book list to be displayed with an widget icon. When the user selects a widget icon 621 corresponding to the electronic book list 1, the controller 180 executes an electronic library function and outputs an electronic book list corresponding to the widget icon. Thus, the user may select the widget icon and immediately edit the relevant electronic book list, for example, LIST 1.

In one embodiment, the electronic book list comprising a list of borrowed books, may further include information of the counterpart who lent or borrowed the electronic book, the information including, for example, a phone number, a lender's name, a firm name, rental period, and rental fee. Furthermore, the electronic book list, listing the shared books, may further include information of the counterpart with whom the electronic book is being shared, the information including, for example, a phone number, a lender's name, a firm name, rental period, and rental fee.

Figure 15A:
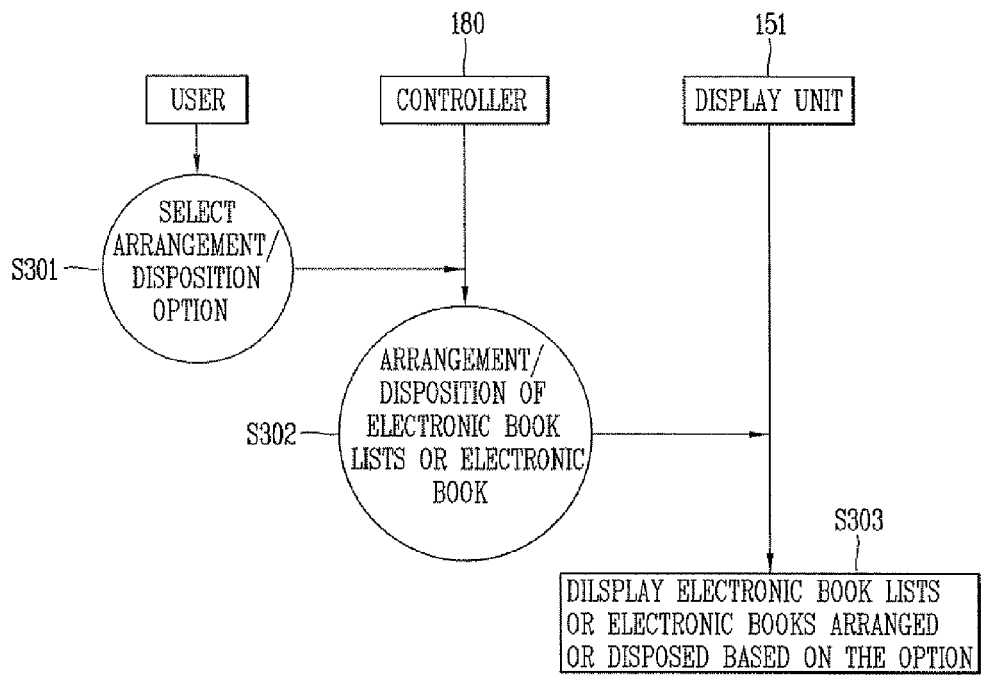
FIGS. 15A and 15B illustrate a method of displaying an E-book list in a mobile terminal according to an embodiment of the present invention.
Figure 15B:
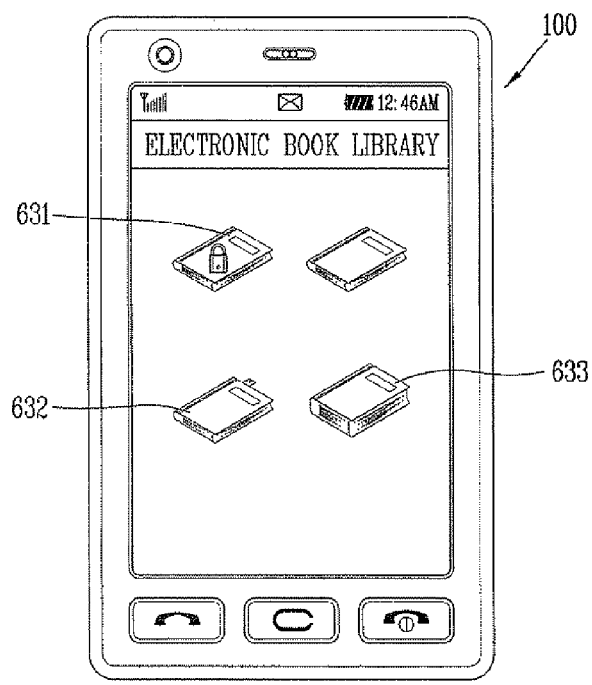

Referring to FIGS. 15A and 15B, a method of displaying an electronic book list in a mobile terminal 100 according to an embodiment of the present invention is described. The electronic book list is a library list that is classified based on the type and characteristic of electronic books, and the electronic book list may be classified directly by the user or automatically classified by the controller 180. For example, the list may be automatically classified by the controller 180 using supplementary information, such as author of the electronic book, purchase date, book that has been read by the user, title of the book, and the like.

However, when a large number of electronic books are possessed by the user, it may not be so helpful for the user to choose an electronic book quickly using only the electronic book list classifying the electronic books as described above. Therefore, a method of disposing or arranging the classified list based on a specific option is further provided in this embodiment.

The disposition or arrangement method may be applicable to an electronic book list or to electronic books in the electronic book list. As illustrated in FIG. 15A, when the user selects an arrangement or disposition option (S301), the controller 180 may dispose or arrange an electronic book list based on the selected option. Furthermore, when a specific electronic book list is selected, electronic books included in the list may be disposed or arranged based on the selected option (S302). The arranged or disposed electronic book list or electronic book is displayed on the display unit 151 (S303). The option may be set as a default, or may be changed by the user.

For example, according to the option, electronic books may be disposed or arranged based on a priority set by the user, such as in the order of name of author, order of title of book, order of purchase date, order of title of book read, order of title of book not read yet, order of remaining book rental period, order of title of book received as a gift, order of name of person giving a gift, or random arrangement. At least two or more of the options for disposing or arranging the electronic books may be combined with one another. The electronic books may be disposed in a group unit based on the option.

The option may be set by using supplementary information such as electronic book type information, purchase information, gift information, shared information, rental information, title, synopsis, author, file size, and the like. In case of random arrangement, if is the number of books are within a predetermined number, then the books may be randomly arranged in a bookshelf, randomly arranged in a space which is not the bookshelf such as a library ground floor, randomly arranged in both spaces, and the like. Otherwise, the exhibition order of the library may be changed step by step based on the number of books in the collection. For example, books may be randomly arranged on the library ground floor if there are less than 5 books, and randomly arranged on the library ground floor and bookshelf if there are less than 10 books.

The foregoing options are merely disclosed as an example. It may be appreciated that more options can be added thereto. In addition, the options may be randomly arranged without selection of the option.

When electronic book lists and electronic books are arranged or disposed as described above, each electronic book may be displayed differently from each other. The electronic book may be displayed in text, icon, or image form. The color or font size in the electronic books may be displayed differently when displayed as text, and the color, luminance, or thickness may be displayed differently or a new image may be additionally displayed when displayed as an icon or image.

For example, as illustrated in FIG. 15B, an electronic book 633 including a plurality of volumes may be displayed relatively thicker than other electronic books, and an image showing a worn-out effect may be applicable to the book cover thereof according to the purchase date of the electronic book. Furthermore, an electronic book including the user's private information, such as a memo written by the user, may be displayed as a specific image such as a lock 631. The electronic book displayed as the specific image as described above may be reproduced by receiving a password. Moreover, if the electronic book comprises a plurality of volumes, and a volume has been read, then part of the book icon corresponding to the volume that has been read or a volume that will be read may be shown in a different color or luminance.

As described above, the electronic book list and individual electronic books may be set as a widget icon on the idle screen. The electronic book list and individual electronic book set as an widget icon allows the user to open the content of the library list and electronic book more easily and quickly. The electronic book list and individual electronic books are located in an electronic library, but the user may select at least one to duplicate or move to the idle screen. When the electronic book list and electronic book are duplicated and moved to the idle screen, they are displayed as widget icons.

For example, if a recently published book list, a this week's bestseller book list, a steady seller book list, a celebrities' recommended book list, or a currently reading book list is displayed on the idle screen as a widget icon, for example, information related to the electronic books in the relevant list will be displayed in detail when the widget icon is selected by the user. The detailed information of the electronic books may be retrieved directly from the mobile terminal 100 or downloaded from a server providing the information.

The above described widget icon may be further configured with an image including additional information such as characteristics of the electronic book list or electronic book. For example, as illustrated in FIG. 14B, a widget icon for the electronic book currently being read by the user may be displayed as an opened book image, or as illustrated in FIG. 15B, the widget icon may be displayed as an electronic book image with a bookmark inserted therein 632. Otherwise, part of the cover or content of the electronic book currently being read by the user may be displayed over an entire idle screen. The content of the line or word that has been read last may be displayed as a background item, and other items of the idle screen may be overlaid on the relevant background item.

Figure 16:
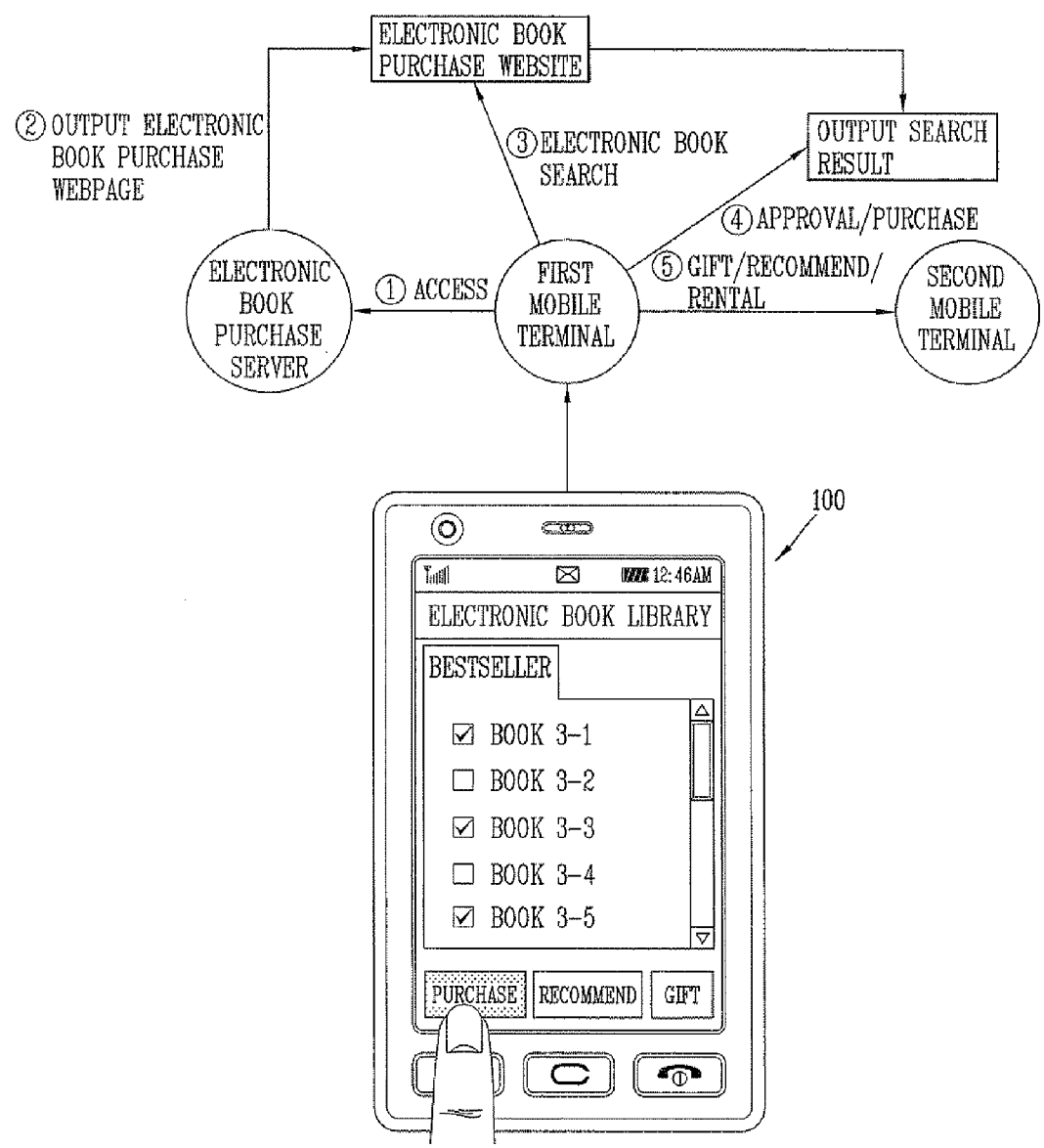
FIG. 16 illustrates a method of purchasing an E-book in a mobile terminal according to an embodiment of the present invention.

Referring to FIG. 16, a method of purchasing an electronic book in a mobile terminal 100 according to an embodiment of the present invention is described. As described above, the user may purchase an electronic book by selecting a desired book from an electronic book list, such as a recently published book list, bestseller book list, or steady seller book list, and subsequently accessing an electronic book seller website. Alternatively, the user may access the electronic book seller website using the Internet and search for a desired electronic book from the website to purchase the book.

In one aspect of the present invention, the electronic book list may be automatically updated periodically or downloaded by accessing an electronic book seller server or book list service server. For example, an updated edition of electronic books constituting a series can be additionally purchased manually or automatically, wherein an additional charge may be paid to download a latest edition.

Furthermore, the purchased electronic book may be given as a gift, loaned, or shared by the user of a first mobile terminal 100 with the user of a second mobile terminal. In addition, the user of the first mobile terminal 100 may recommend the electronic book list or electronic book to the second mobile terminal.

Referring to FIGS. 17A through 17F, a method of displaying an electronic book in a mobile terminal 100 according to an embodiment of the present invention is described. The user may select electronic books in the electronic library or a widget icon to choose a desired book from the displayed electronic books. For example, when an arbitrary electronic book is selected by the user, the controller 180 may display the content by opening the electronic book. When opening the electronic book, an animation effect may be applied thereto. For example, a sound effect may be output when pages are turned over while the electronic book is reproduced in an audio mode, or an image for turning over pages may be outputted when the electronic book is reproduced in a text or image mode.

Figure 17A:
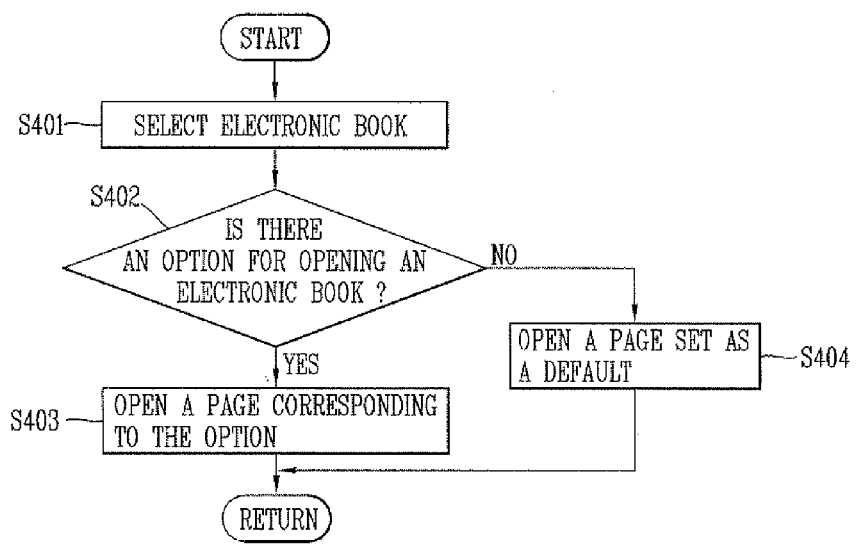

In one aspect of the present invention, as illustrated in FIG. 17A, when an electronic book is selected by the user (S401), the controller 180 checks whether or not an option for opening an electronic book is set (S402). If the option is set, then a page is opened according to the set option (S403), and if the option is not set, then a page may be opened according to a default setting (S404). For example, a portion that is initially displayed when opening the electronic book may be set by the user. Accordingly, if the portion that will be displayed initially upon opening the electronic book is set, then the setting can be applied for every electronic book that is opened.

For example, the initially displayed portion may be a cover of the electronic book, a page that has been read last right before the electronic book was shut down, or a page containing a table of contents. Further, when the user is finished reading, a last line read can be indicated by the user. Therefore, when the electronic book is reopened, the line read last on the relevant page will be disposed at the beginning, thereby allowing the user to read a following line from the beginning. This bookmarking function may be executed automatically or manually.

Figure 17B:
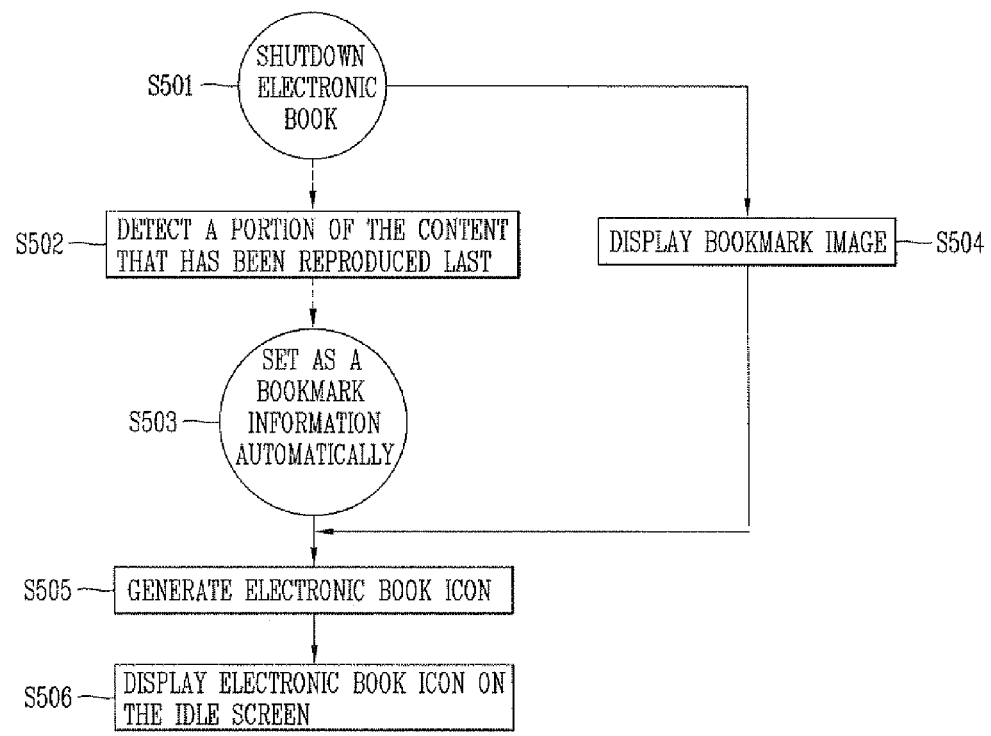

Referring to FIG. 17B, a method of setting bookmark information when reproduction of an electronic book is finished and a method of using the bookmark information when reproduction of the electronic book is resumed will be described. When the user finishes the reproduction of an electronic book or the electronic book is turned off (S501), the controller 180 detects the last portion of the content being reproduced (S502), thereby automatically setting the detected last portion as a bookmark (S503). Then, an image indicating that the bookmark has been set (hereinafter, bookmark image) may be displayed (S504).

For example, the bookmark image may be displayed such that a side corner of the page appears folded. At this time, the process in which the corner is being folded may be displayed in an animation form. Subsequent to setting the bookmark information as described above, the controller 180 generates an electronic book icon including the bookmark information (S505) and displays the electronic book icon on the idle screen of the display unit 151 (S506). If reading of the electronic book is not finished, the user can manually set at least the page, paragraph, phrase, line, word, or memo regarding contents of interest as bookmark information.

When bookmark information is manually set as described above, the bookmark information may be set in response to a touch input received via the touch screen as well as an input received via a specific button or menu. For example, as illustrated in FIG. 17C, a portion to be set as the bookmark information may be dragged toward a predetermined area such as a side corner of the touch screen such that the controller 180 sets the information of the touched portion as bookmark information and displays a bookmark image 711 in the dragged area. When the bookmark information is automatically or manually set as described above, at least one of the set bookmark information may be displayed on the bookmark image.

In one aspect of the present invention, the bookmark may be stored with a memo indicating a page number and line number last read. For example, when a paper folding bookmark is used, a corner of the electronic book is dragged by a finger to fold a page and cause a cursor to blink, thereby allowing the user to write a memo in the folded region. Alternatively, if the user drags a line or word to the relevant corner, then the line or word is written in the folder region.

When bookmark information is set and the electronic book is shut down, the controller 180 displays an electronic book icon including the generated bookmark information. Accordingly, if several electronic books are currently being read, then electronic book icons corresponding to the number of the electronic books being read may be displayed on the idle screen.

Figure 17D:
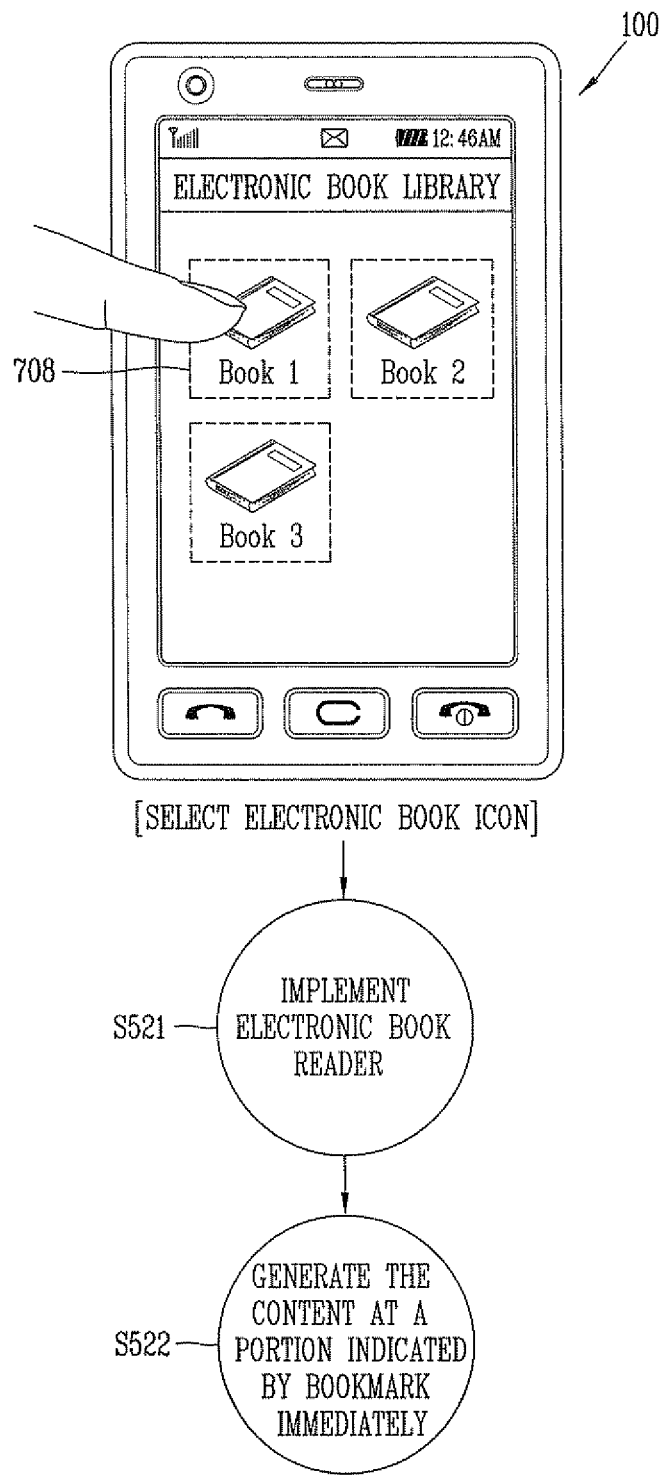

Furthermore, as illustrated in FIG. 17D, when the electronic book icon 708 is selected, the controller 180 implements an "electronic book reader" (S521), and immediately reproduces the content of the portion indicated by the bookmark information included in the electronic book icon as a beginning portion (S522). For example, the portion containing the page, paragraph, phrase, line, word, or memo indicated by the bookmark information may be displayed at the uppermost portion of the displayed page.

Figure 17E:
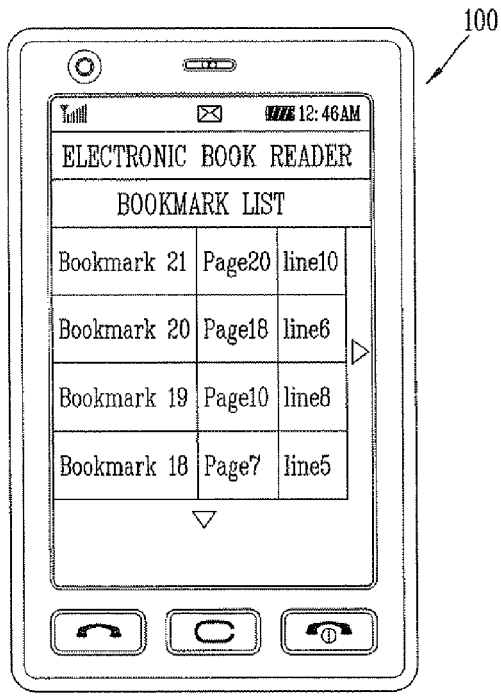

According to an embodiment of the present invention, as illustrated in FIG. 17E, bookmark information manually set by the user and bookmark information that have been automatically generated whenever an electronic book is shut down may be continuously accumulated. Thus, the bookmark information directly set by the user may be continuously accumulated unless it is deleted by the user. However, the automatically generated bookmark information may be deleted periodically from the oldest bookmark information or if the number of the bookmark information exceeds a preset number. Since bookmark information is accumulated as described above, the user may select any one of the bookmark information to reproduce an electronic book.

Figure 17F:
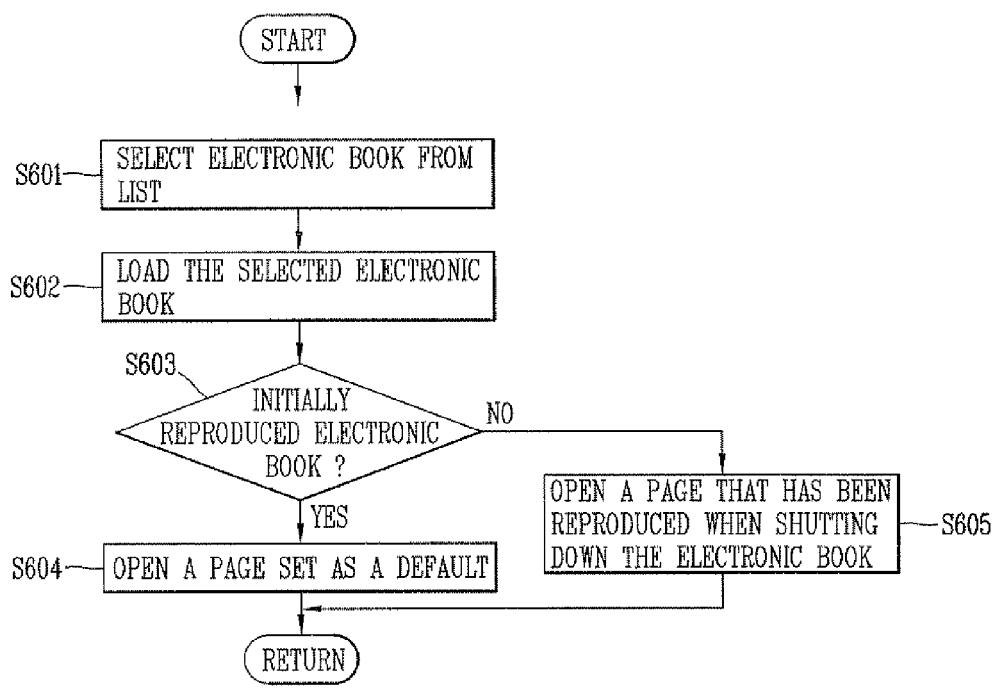

According to another embodiment of the present invention, as illustrated in FIG. 17F, when the user selects an electronic book from an electronic book list (S601), the controller 180 downloads the selected electronic book from the memory 160 or the server (not shown) to load the electronic book (S602). Then, the electronic book is reproduced according to a preset mode, such as a text mode, sound mode, or dual mode, and it may be checked whether the electronic book is reproduced for the first time (S603). If the selected electronic book is reproduced for the first time, the first page or a page set as default may be reproduced (S604), and if the electronic book has been reproduced previously, the page that was previously reproduced prior to the electronic book being shut down may be reproduced (S605).

Accordingly, the controller 180 may store and manage history information for each electronic book in the memory 160. Therefore, as the user repeats reproduction of the electronic book and finally finishes reading the electronic book, the history information will increase. For example, the history information stores page information of a last reproduced page whenever the electronic book is shut down. Accordingly, the user may list the history information, and select and reproduce one of the pages from the list. Therefore, the history information may serve as bookmark information.

According to yet another embodiment of the present invention, a method of selecting one of a plurality of electronic books in a series in which several volumes of electronic books comprises a set will be described. For example, when a series electronic book is touched by the user, the controller 180 may scroll an electronic book number of the relevant series while the user maintains the touch. An electronic book corresponding to the number may be displayed upon the touch being released by the user when the user's desired electronic book number appears. When a series book view is selected, a selection of a book number to be read, a continuous view of selected books for beginning from the cover or table of contents, or a continuous view of the content for displaying from the main body may be selected. The page displayed when the electronic book is opened may be a first page or a page that was displayed last prior to the electronic book being shut down depending on the setting.

Figure 18:
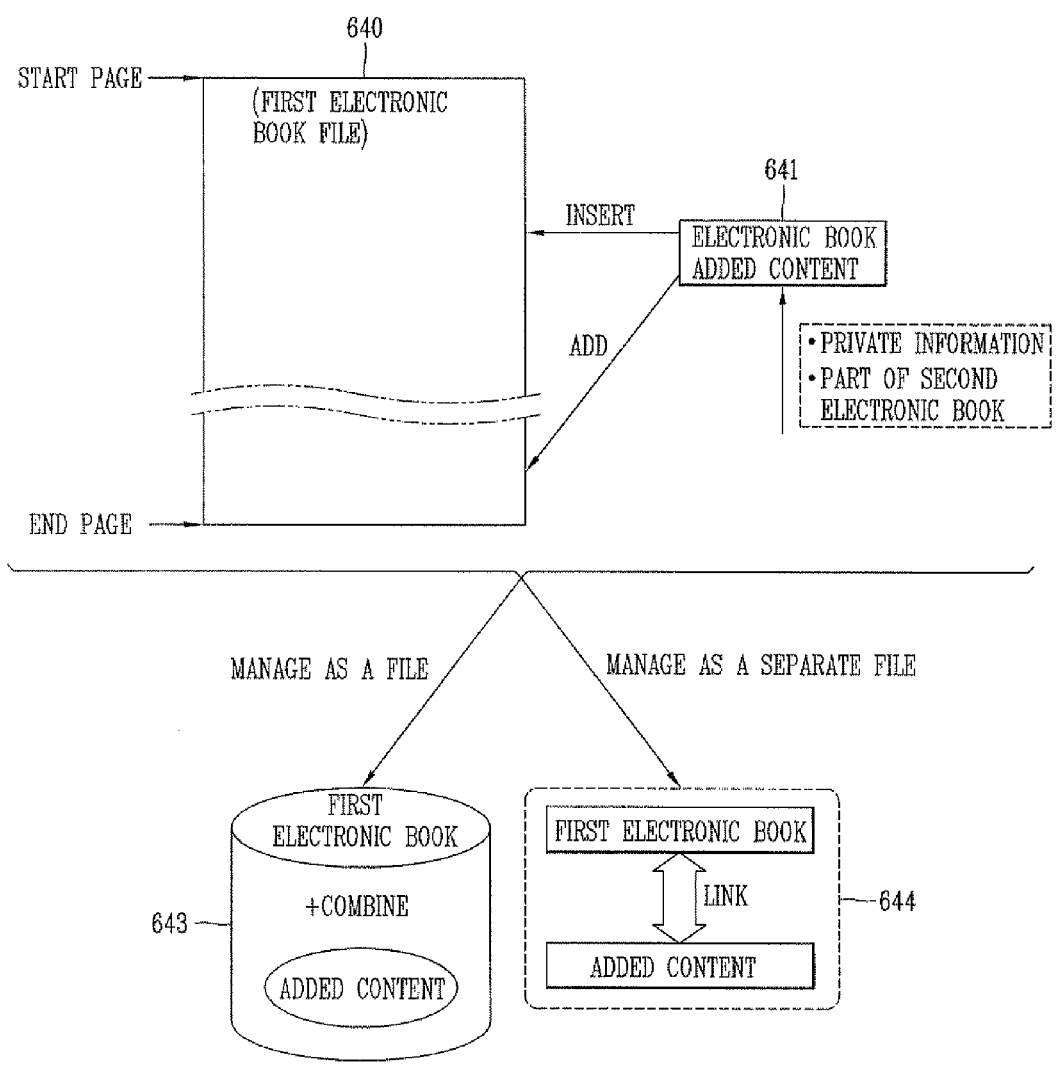
FIG. 18 illustrates a method of adding an E-book to a mobile terminal according to an embodiment of the present invention.

Referring to FIG. 18, a method of adding an electronic book to a mobile terminal 100 according to an embodiment of the present invention is described. The user may open an electronic book as described above and also add additional content of the electronic book using private information of the user. For example, the private information may include at least a diary, photo album, video album, or memo.

In one aspect of the present invention, part of the content of another electronic book or a second electronic book may be added to the content of the first electronic book. When the content of an electronic book is added as described above, the location of where to add to the first electronic book may be set. In other words, added content may be added next to a specific page of the first electronic book 640, or added by overlaying the added content on the specific page, or added to the last page of the first electronic book. Here, it is assumed that the first and second electronic books are set with a digital copyright for allowing the user to edit, extract, and add the content of the first and the second electronic books. Otherwise, it is assumed that the edited content of the second electronic book included in the first electronic book is effectively maintained when the copyright of the second electronic book is not expired.

The added content 641 as described above may be managed as a separate file (644). However, even if the added content 641 is managed as a separate file, it will be managed in conjunction with the electronic book. When the electronic book is open, the added content file in conjunction with the electronic book will be opened together therewith. Although the user may be unconscious of an electronic book file and an added content file in conjunction therewith, the controller 180 automatically manages the electronic book and the added content file.

In another aspect of the present invention, the added content may not be managed as a separate file but managed by being combined with an original electronic book file (643). Further, although not shown in the drawing, an electronic book that is reproduced frequently by the user may be set as a background screen of the mobile terminal 100 using part of the cover or content thereof. Furthermore, when the effective period is set in the electronic book, for example, when the electronic book is borrowed, the remaining rental period may be notified to the user in advance.

As described above, preferred embodiments of the present invention have been described with reference to the accompanying drawings. Here, the terms and words used herein and the claims should not be construed by limiting to their typical or lexical meaning, but should be construed based on the meaning and concept conforming to the technical spirit of the present invention.

Accordingly, the configuration illustrated in the embodiments disclosed herein and the drawings is merely the most preferred embodiment of the present invention, and is not intended to represent all the technical spirit of the present invention, and thereby it should be appreciated that there may exist various equivalents and modifications for substituting those at the time of filing this application.

What is claimed is:

1. A method of controlling a mobile terminal, the method comprising:
    displaying an electronic book on a display of the mobile terminal, wherein the display comprises an electronic paper display and a liquid crystal display (LCD) overlapped with each other and configured to be turned on selectively such that only the electronic paper display or the LCD, or both the electronic paper display and the LCD are turned on based on a status of the mobile terminal, and wherein the electronic book is displayed on the electronic paper display of the display;
    extracting a specific portion from the electronic book;
    storing the extracted specific portion and copyright information associated with the extracted specific portion;
    applying the extracted specific portion to a messaging application such that the extracted specific portion is displayed within the messaging application;
    sending the extracted specific portion and the associated copyright information to another electronic book, an electronic document, or a menu;
    displaying the extracted specific portion on the electronic paper display when the LCD is in an off state;
    displaying the extracted specific portion on the LCD when the LCD is in an on state; and
    displaying an indicator icon on the electronic paper display when the mobile terminal enters a locked state, the indicator icon corresponding to the status of the mobile terminal.

2. The method of claim 1, further comprising:
    extracting a plurality of specific portions from the electronic book;
    storing the plurality of extracted specific portions; and
    displaying a selected one of the plurality of extracted specific portions in response to a selection of the selected one extracted specific portion.

3. The method of claim 2, wherein multiple extracted specific portions are selected, and the selected multiple extracted specific portions are displayed in a slide show format.

4. The method of claim 1, wherein extracting the specific portion comprises:
    selecting the specific portion in response to a touch input defining an area of the specific portion, the touch input comprising a touch at a first point and a drag input from the first point to a second point; and
    extracting the selected specific portion in response to a release of the touch input at the second point.

5. The method of claim 1, wherein the extracted specific portion corresponds to information received comprising at least a page number or a line number of the electronic book.

6. The method of claim 1, wherein extracting and storing the extracted specific portion are performed concurrently.

7. The method of claim 1, wherein storing the extracted specific portion comprises:
    changing a first format of associated content of the extracted specific portion to a second format; and
    storing the associated content in the second format,
    wherein the first format and the second format each correspond to one of an image format, an audio format, or a text format; and
    wherein the first format and the second format are distinct.

8. The method of claim 1, further comprising highlighting on the display the selected specific portion to be extracted and un-highlighting on the display the highlighted specific portion when the specific portion is extracted and stored.

9. The method of claim 1, further comprising adding the extracted specific portion to content of the another electronic book, the electronic document, or the menu.

10. The method of claim 9, further comprising adding the associated copyright information to the content of the another electronic book, the electronic document, or the menu, wherein the associated copyright information includes at least:
    a name of an author,
    a title,
    a position of the extracted specific portion in the electronic book,
    a publisher, or
    a statement related to the associated copyright information.

11. A mobile terminal, comprising:
    a display comprising an electronic paper display and a liquid crystal display (LCD) overlapped with each other and configured to be turned on selectively such that only the electronic paper display or the LCD, or both the electronic paper display and the LCD are turned on based on a status of the mobile terminal;

a memory; and a controller configured to:
- cause the electronic paper display to display an electronic book;
- extract a specific portion from the electronic book in response to a selection input;
- cause the memory to store the extracted specific portion and associated copyright information associated with the extracted specific portion;
- apply the extracted specific portion to a messaging application such that the extracted specific portion is displayed within the messaging application;
- send the extracted specific portion and the associated copyright information to another electronic book, an electronic document, or a menu;
- cause the electronic paper display to display the extracted specific portion when the LCD is in an off state;
- cause the LCD to display the extracted specific portion when the LCD is in an on state; and
- cause the electronic paper display to display an indicator icon when the mobile terminal enters a locked state, the indicator icon corresponding to the status of the mobile terminal.

12. The mobile terminal of claim 11, wherein the controller is further configured to:
- extract a plurality of specific portions from the electronic book;
- cause the memory to store the plurality of extracted specific portions; and
- cause the display to display a selected one of the plurality of extracted specific portions in response to a selection of the selected one extracted specific portion.

13. The mobile terminal of claim 11, wherein the display is configured to detect touch inputs and the controller is further configured to:
- select the specific portion to be extracted in response to a touch input defining an area of the specific portion, the touch input comprising a touch at a first point and a drag input from the first point to a second point; and
- extract the selected specific portion in response to a release of the touch input at the second point.

14. The mobile terminal of claim 11, wherein the extracted specific portion corresponds to information received comprising at least a page number or a line number of the electronic book.

15. The mobile terminal of claim 11, wherein the controller is further configured to extract and cause the memory to store the specific portion concurrently.

16. The mobile terminal of claim 11, wherein the controller is further configured to:
- change a first format of associated content of the extracted specific portion to a second format; and
- cause the memory to store the associated content in the second format,
- wherein the first format and the second format each correspond to one of an image format, an audio format, or a text format, and
- wherein the first format and the second format are distinct.

17. The mobile terminal of claim 11, wherein the controller is further configured to highlight the selected specific portion to be extracted and to un-highlight the highlighted specific portion when the specific portion is extracted and stored.

18. The mobile terminal of claim 11, wherein the controller is further configured to add the extracted specific portion to content of the another electronic book, the electronic document, or the menu.

19. The mobile terminal of claim 18, wherein the controller is further configured to add the associated copyright information to the content of the another electronic book, the electronic document, or the menu, wherein the associated copyright information includes at least:
- a name of an author,
- a title,
- a position of the extracted specific portion in the electronic book,
- a publisher, or
- a statement related to the associated copyright information.

* * * * *